US012581434B2

(12) United States Patent
Naik et al.

(10) Patent No.: US 12,581,434 B2
(45) Date of Patent: Mar. 17, 2026

(54) TIME SYNCHRONIZATION OVER A WIRELESS NETWORK FOR LATENCY-SENSITIVE TRAFFIC

(71) Applicant: QUALCOMM Incorporated, San Diego, CA (US)

(72) Inventors: Gaurang Naik, San Diego, CA (US); Alfred Asterjadhi, San Diego, CA (US); Abdel Karim Ajami, San Diego, CA (US); George Cherian, San Diego, CA (US); Yanjun Sun, San Diego, CA (US); Abhishek Pramod Patil, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/717,791

(22) Filed: Apr. 11, 2022

(65) Prior Publication Data

US 2023/0328669 A1 Oct. 12, 2023

(51) Int. Cl.
*H04W 56/00* (2009.01)
*H04W 52/02* (2009.01)
*H04W 76/18* (2018.01)

(52) U.S. Cl.
CPC ... *H04W 56/0015* (2013.01); *H04W 52/0216* (2013.01); *H04W 76/18* (2018.02)

(58) Field of Classification Search
None
See application file for complete search history.

(56) References Cited

U.S. PATENT DOCUMENTS 8,942,201 B1 * 1/2015 Duvvuri ............. H04W 74/085
370/314
9,332,517 B2 5/2016 Kim et al.
(Continued)

FOREIGN PATENT DOCUMENTS

CN        115715013 A  *  2/2023  ............ H04W 76/15
WO    WO-2020185586 A1 *  9/2020  .......... H04B 17/336
WO    WO-2022228400 A1 * 11/2022  .......... H04W 74/006

OTHER PUBLICATIONS

International Search Report and Written Opinion—PCT/US2023/063787—ISA/EPO—Jun. 2, 2023.
(Continued)

*Primary Examiner* — Brandon M Renner
(74) *Attorney, Agent, or Firm* — Holland & Hart LLP

(57) ABSTRACT

This disclosure provides systems and methods for synchronizing wireless devices with each other. In some implementations, a device transmits, to at least one wireless station (STA), an indication of an enhanced synchronization mode on a first communication link associated with a first access point (AP) of the device. The device transmits, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the device. In some instances, at least one of the plurality of sync frames may be a Fast Initial Link Setup (FILS) Discovery frame carrying a TSF value of the first AP.

30 Claims, 18 Drawing Sheets

1100

1102

Transmit, to at least one wireless station (STA), an indication of an enhanced synchronization mode on a first communication link associated with a first access point (AP) of the device.

1104

Transmit, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the device.

(56)             References Cited

U.S. PATENT DOCUMENTS

| | | | |
|---|---|---|---|
| 2015/0131528 A1 | 5/2015 | Abraham et al. | |
| 2020/0137704 A1* | 4/2020 | Vermani | H04L 5/0053 |
| 2021/0014911 A1 | 1/2021 | Patil et al. | |
| 2021/0377856 A1* | 12/2021 | Chu | H04W 72/0446 |
| 2022/0029736 A1* | 1/2022 | Chu | H04L 1/0023 |
| 2023/0126846 A1* | 4/2023 | Ratnam | H04W 52/0216 |
| | | | 370/311 |

OTHER PUBLICATIONS

Park M(Intel Corp)., et al. "Multi-Link TSF Discussion", 11-20-0426-01-00BE-Multi-Link-TSF-Discussion, IEEE-SA Mentor, Piscataway, NJ USA, vol. 802.11 EHT, 802.11be, No. 1, Jun. 9, 2020, pp. 1-9, XP068169462, The whole document.
Wang S (Motorola)., et al., "Proposal for TBTT Offset Simplification, 11-04-1213-00-000k-proposal-tbtt-offset-simplification", 11-04-1213-00-000K-Proposal-TBTT-Offset-Simplification, IEEE-SA Mentor, Piscataway, NJ USA, vol. 802.11k, Nov. 12, 2004, pp. 1-10, XP017690031, [retrieved on Nov. 12, 2004] The whole document.

* cited by examiner

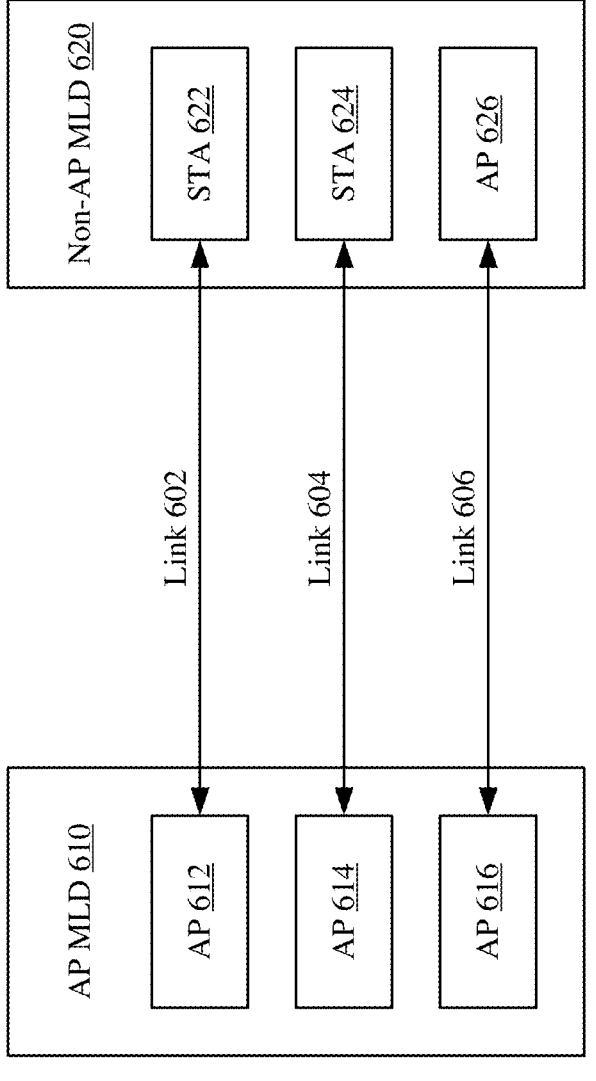
*Figure 6*

1100

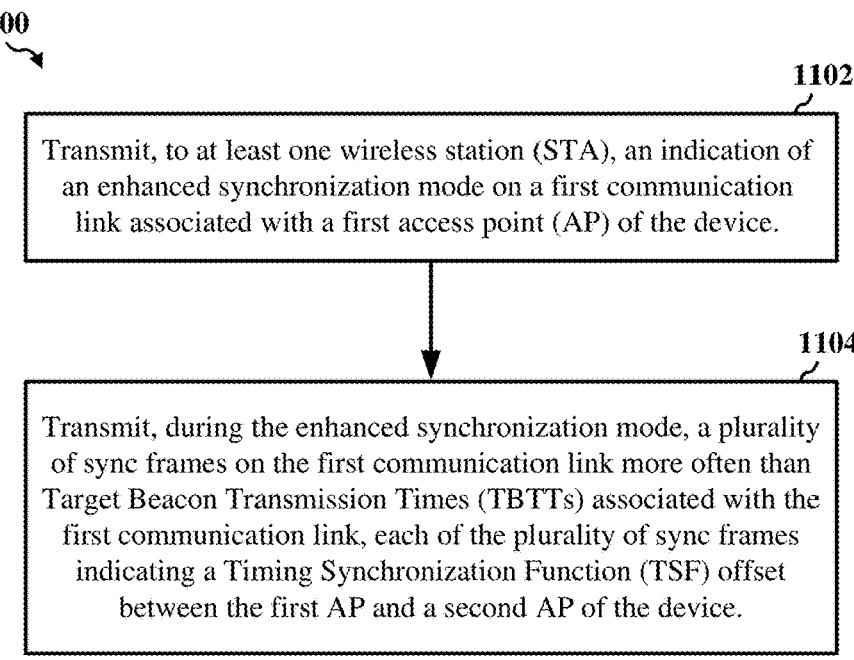

1102

Transmit, to at least one wireless station (STA), an indication of an enhanced synchronization mode on a first communication link associated with a first access point (AP) of the device.

1104

Transmit, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the device.

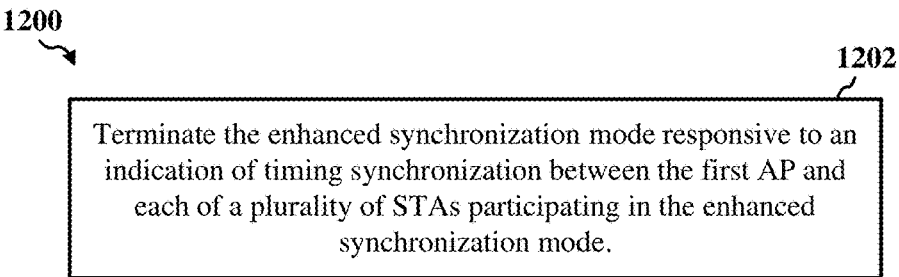

1202

Terminate the enhanced synchronization mode responsive to an indication of timing synchronization between the first AP and each of a plurality of STAs participating in the enhanced synchronization mode.

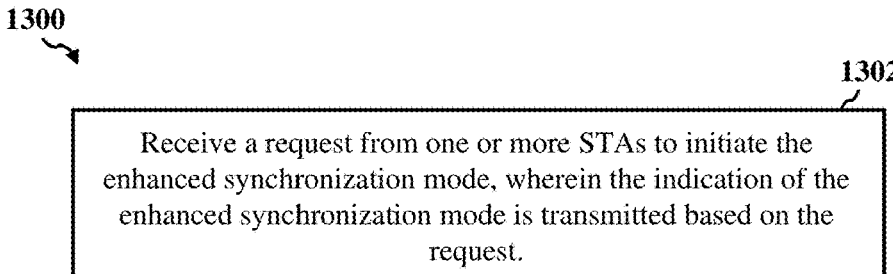

1302

Receive a request from one or more STAs to initiate the enhanced synchronization mode, wherein the indication of the enhanced synchronization mode is transmitted based on the request.

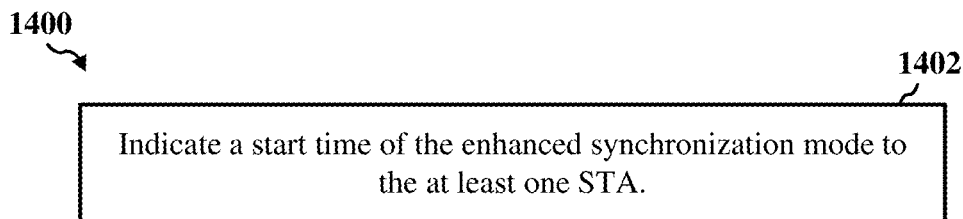

Indicate a start time of the enhanced synchronization mode to the at least one STA.

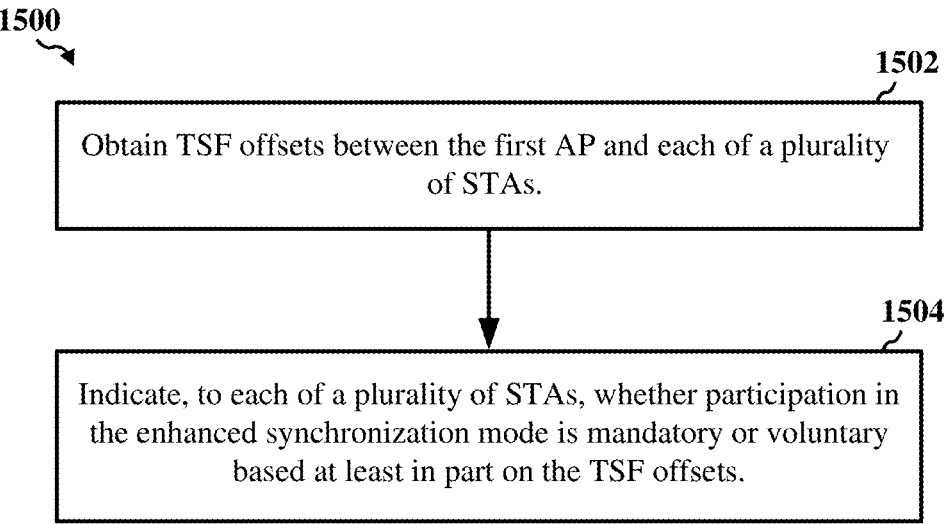

Obtain TSF offsets between the first AP and each of a plurality of STAs.

1504

Indicate, to each of a plurality of STAs, whether participation in the enhanced synchronization mode is mandatory or voluntary based at least in part on the TSF offsets.

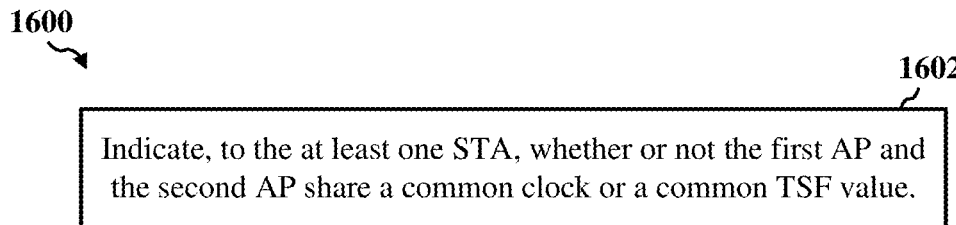

Indicate, to the at least one STA, whether or not the first AP and the second AP share a common clock or a common TSF value.

Figures 17, 18:
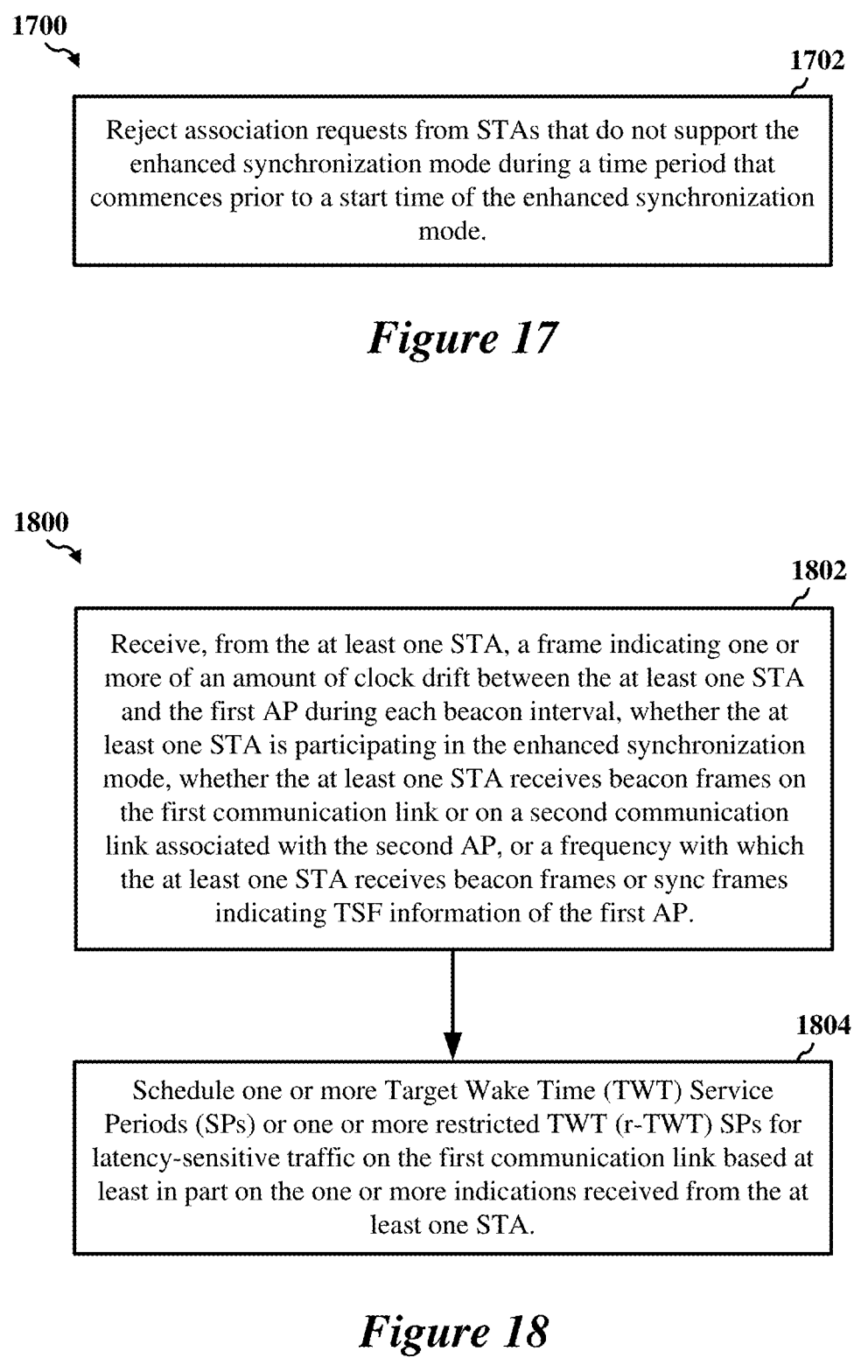

Reject association requests from STAs that do not support the enhanced synchronization mode during a time period that commences prior to a start time of the enhanced synchronization mode.

Receive, from the at least one STA, a frame indicating one or more of an amount of clock drift between the at least one STA and the first AP during each beacon interval, whether the at least one STA is participating in the enhanced synchronization mode, whether the at least one STA receives beacon frames on the first communication link or on a second communication link associated with the second AP, or a frequency with which the at least one STA receives beacon frames or sync frames indicating TSF information of the first AP.

1804

Schedule one or more Target Wake Time (TWT) Service Periods (SPs) or one or more restricted TWT (r-TWT) SPs for latency-sensitive traffic on the first communication link based at least in part on the one or more indications received from the at least one STA.

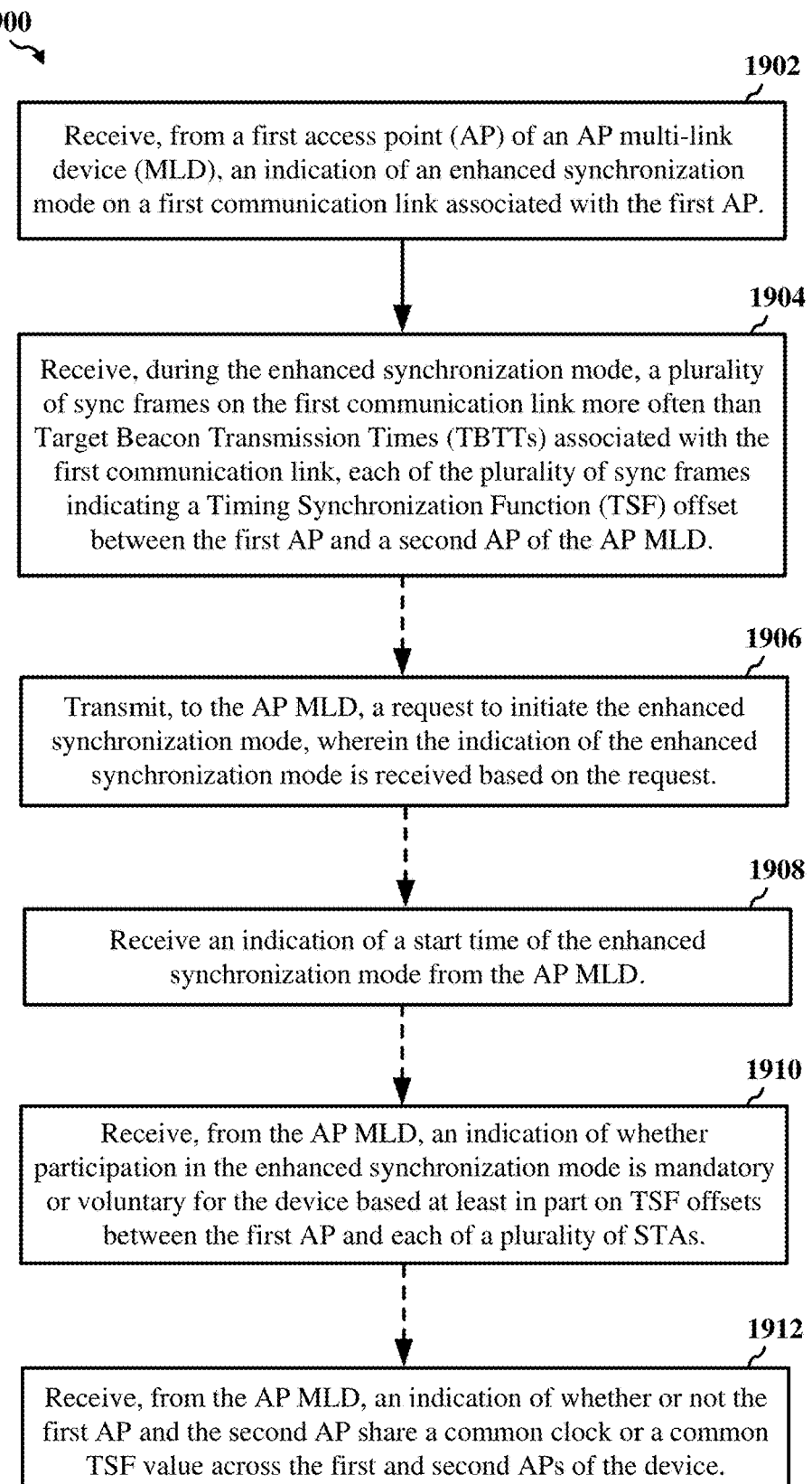

1902

Receive, from a first access point (AP) of an AP multi-link device (MLD), an indication of an enhanced synchronization mode on a first communication link associated with the first AP.

1904

Receive, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the AP MLD.

1906

Transmit, to the AP MLD, a request to initiate the enhanced synchronization mode, wherein the indication of the enhanced synchronization mode is received based on the request.

1908

Receive an indication of a start time of the enhanced synchronization mode from the AP MLD.

1910

Receive, from the AP MLD, an indication of whether participation in the enhanced synchronization mode is mandatory or voluntary for the device based at least in part on TSF offsets between the first AP and each of a plurality of STAs.

1912

Receive, from the AP MLD, an indication of whether or not the first AP and the second AP share a common clock or a common TSF value across the first and second APs of the device.

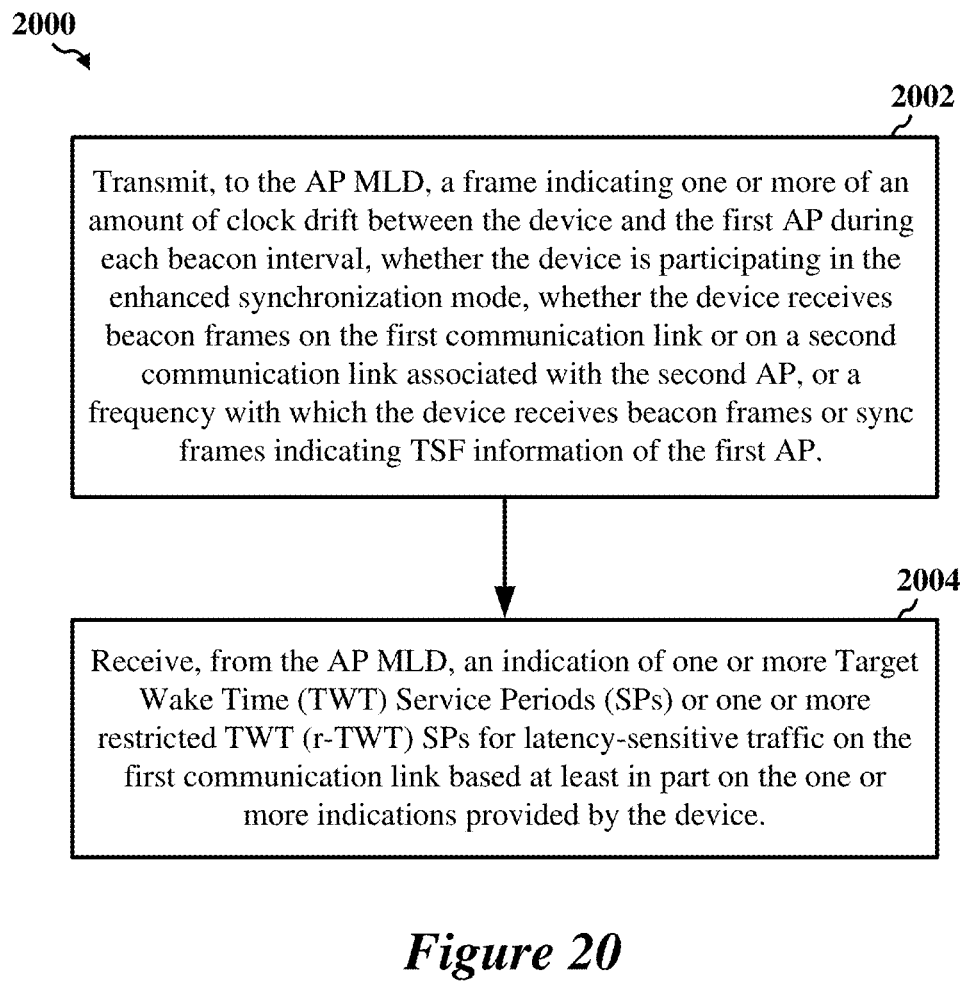

Transmit, to the AP MLD, a frame indicating one or more of an amount of clock drift between the device and the first AP during each beacon interval, whether the device is participating in the enhanced synchronization mode, whether the device receives beacon frames on the first communication link or on a second communication link associated with the second AP, or a frequency with which the device receives beacon frames or sync frames indicating TSF information of the first AP.

2004

Receive, from the AP MLD, an indication of one or more Target Wake Time (TWT) Service Periods (SPs) or one or more restricted TWT (r-TWT) SPs for latency-sensitive traffic on the first communication link based at least in part on the one or more indications provided by the device.

*Figure 20*

RX
Signals

TX
Signals

TIME SYNCHRONIZATION OVER A WIRELESS NETWORK FOR LATENCY-SENSITIVE TRAFFIC

TECHNICAL FIELD

This disclosure relates generally to wireless communications, and more specifically, to maintaining synchronization between wireless stations (STAs) and each of a plurality of access points (APs) of a device.

DESCRIPTION OF THE RELATED TECHNOLOGY

A wireless local area network (WLAN) may be formed by one or more access points (APs) that provide a shared wireless medium for use by a number of client devices such as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP in beacon frames periodically broadcasted over the wireless medium so that STAs within wireless range of the AP can associate with the AP and establish a wireless communication link with the WLAN.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Thus, it is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless device. The wireless device can include at least one processor and at least one memory communicatively coupled with the at least one processor. In some implementations, the memory stores processor-readable code that, when executed by the at least one processor, is configured to transmit, to at least one wireless station (STA), an indication of an enhanced synchronization mode on a first communication link associated with a first access point (AP) of the device. Execution of the processor-readable code is configured to transmit, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the device. In some aspects, each of the plurality of sync frames may also indicate the TSF value of the first AP. In some instances, the indication may be carried in one or more of a beacon frame, a probe response frame, a broadcast action frame, or a Target Wake Time (TWT) response frame transmitted on the first communication link.

In various implementations, the device may be an AP multi-link device (MLD) including the first AP and the second AP, the first AP associated with the first communication link, the second AP associated with a second communication link occupying a different frequency band than the first communication link. In some implementations, the enhanced synchronization mode may be established in conjunction with one or more Target Wake Time (TWT) Service Periods (SPs) or one or more restricted TWT (r-TWT) SPs scheduled on the first communication link. In some instances, at least one of the plurality of sync frames may be a Fast Initial Link Setup (FILS) Discovery frame carrying a TSF value of the first AP and a TSF offset value of the second AP. In other instances, a time period between successive transmissions of the sync frames may be approximately 20 milliseconds. In various aspects, the plurality of sync frames may be transmitted at a data rate that is greater than a Basic data rate associated with beacon frame transmissions on the first communication link.

In various implementations, execution of the processor-readable code may be configured to terminate the enhanced synchronization mode responsive to an indication of timing synchronization between the first AP and each of a plurality of STAs participating in the enhanced synchronization mode. In some instances, termination of the enhanced synchronization mode may be further based on an indication of timing synchronization between the second AP and each of the plurality of STAs participating in the enhanced synchronization mode.

In some other implementations, execution of the processor-readable code may be configured to receive a request from one or more STAs to initiate the enhanced synchronization mode, where the indication of the enhanced synchronization mode is transmitted based on the request.

In some implementations, execution of the processor-readable code may be configured to indicate a start time of the enhanced synchronization mode to the at least one STA. In some instances, the indicated start time may be carried in one or more of a beacon frame, a probe response frame, a broadcast action frame, or a TWT response frame transmitted on the first communication link.

In other implementations, execution of the processor-readable code may be configured to indicate, to the at least one STA, whether or not the first AP and the second AP share a common clock or a common TSF value across the first and second APs of the device. In some instances, the indication of the common clock or the common TSF value across the first and second APs of the device may be carried in one or more of a beacon frame, a probe response frame, a broadcast action frame, or the sync frames.

In some other implementations, execution of the processor-readable code may be configured to obtain TSF offsets between the first AP and each of a plurality of STAs, and to indicate, to each of a plurality of STAs, whether participation in the enhanced synchronization mode is mandatory or voluntary based at least in part on the TSF offsets. In some instances, whether participation in the enhanced synchronization mode is mandatory or voluntary for at least some of the plurality of STAs may be further based on an indication of latency-sensitive traffic on the first communication link. In some aspects, execution of the processor-readable code may be configured to reject association requests from STAs that do not support the enhanced synchronization mode during a time period that commences prior to a start time of the enhanced synchronization mode.

In various implementations, execution of the processor-readable code may be configured to receive, from the at least one STA, a frame indicating one or more of an amount of clock drift between the at least one STA and the first AP during each beacon interval, whether the at least one STA is participating in the enhanced synchronization mode, whether the at least one STA receives beacon frames on the first communication link or on a second communication link associated with the second AP, or a frequency with which the at least one STA receives beacon frames or sync frames indicating TSF information of the first AP. Execution of the processor-readable code may be configured to schedule one or more TWT SPs or one or more r-TWT SPs for latency-sensitive traffic on the first communication link based at least in part on the one or more indications received from the at least one STA.

Another innovative aspect of the subject matter described in this disclosure can be implemented as a method for wireless communication by a device. In some implementations, the method includes transmitting, to at least one STA, an indication of an enhanced synchronization mode on a first communication link associated with a first AP of the device. The method includes transmitting, during the enhanced synchronization mode, a plurality of sync frames on the first communication link more often than TBTTs associated with the first communication link, each of the plurality of sync frames indicating a TSF offset between the first AP and a second AP of the device. In some aspects, each of the plurality of sync frames may also indicate the TSF value of the first AP. In some instances, the indication may be carried in one or more of a beacon frame, a probe response frame, a broadcast action frame, or a TWT response frame transmitted on the first communication link.

In various implementations, the device may be an AP MLD including the first AP and the second AP, the first AP associated with the first communication link, the second AP associated with a second communication link occupying a different frequency band than the first communication link. In some implementations, the enhanced synchronization mode may be established in conjunction with one or more TWT SPs or one or more restricted r-TWT SPs scheduled on the first communication link. In some instances, at least one of the plurality of sync frames may be a FILS Discovery frame carrying a TSF value of the first AP and a TSF offset value of the second AP. In other instances, a time period between successive transmissions of the sync frames may be approximately 20 milliseconds. In various aspects, the plurality of sync frames may be transmitted at a data rate that is greater than a Basic data rate associated with beacon frame transmissions on the first communication link.

In various implementations, the method may also include terminating the enhanced synchronization mode responsive to an indication of timing synchronization between the first AP and each of a plurality of STAs participating in the enhanced synchronization mode. In some instances, termination of the enhanced synchronization mode may be further based on an indication of timing synchronization between the second AP and each of the plurality of STAs participating in the enhanced synchronization mode.

In some other implementations, the method may also include receiving a request from one or more STAs to initiate the enhanced synchronization mode, where the indication of the enhanced synchronization mode is transmitted based on the request.

In some implementations, the method may also include indicating a start time of the enhanced synchronization mode to the at least one STA. In some instances, the indicated start time may be carried in one or more of a beacon frame, a probe response frame, a broadcast action frame, or a TWT response frame transmitted on the first communication link.

In other implementations, the method may also include indicating, to the at least one STA, whether or not the first AP and the second AP share a common clock or a common TSF value across the first and second APs of the device. In some instances, the indication of the common clock or the common TSF value across the first and second APs of the device may be carried in one or more of a beacon frame, a probe response frame, a broadcast action frame, or the sync frames.

In some other implementations, the method may also include obtaining TSF offsets between the first AP and each of a plurality of STAs, and indicating, to each of a plurality of STAs, whether participation in the enhanced synchronization mode is mandatory or voluntary based at least in part on the TSF offsets. In some instances, whether participation in the enhanced synchronization mode is mandatory or voluntary for at least some of the plurality of STAs may be further based on an indication of latency-sensitive traffic on the first communication link. In some aspects, the method may also include rejecting association requests from STAs that do not support the enhanced synchronization mode during a time period that commences prior to a start time of the enhanced synchronization mode.

In various implementations, the method may also include receiving, from the at least one STA, a frame indicating one or more of an amount of clock drift between the at least one STA and the first AP during each beacon interval, whether the at least one STA is participating in the enhanced synchronization mode, whether the at least one STA receives beacon frames on the first communication link or on a second communication link associated with the second AP, or a frequency with which the at least one STA receives beacon frames or sync frames indicating TSF information of the first AP. The method may also include scheduling one or more TWT SPs or one or more r-TWT SPs for latency-sensitive traffic on the first communication link based at least in part on the one or more indications received from the at least one STA.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6 shows an example communication system that includes an access point (AP) multi-link device (MLD) and a non-AP MLD.

FIGS. 11-18 show flowcharts illustrating example operations for wireless communication that supports an enhanced synchronization mode, according to some implementations.

FIGS. 19-20 show flowcharts illustrating example operations for wireless communication that supports an enhanced synchronization mode, according to some other implementations.

Like reference numbers and designations in the various drawings indicate like elements.

DETAILED DESCRIPTION

Figure 1:
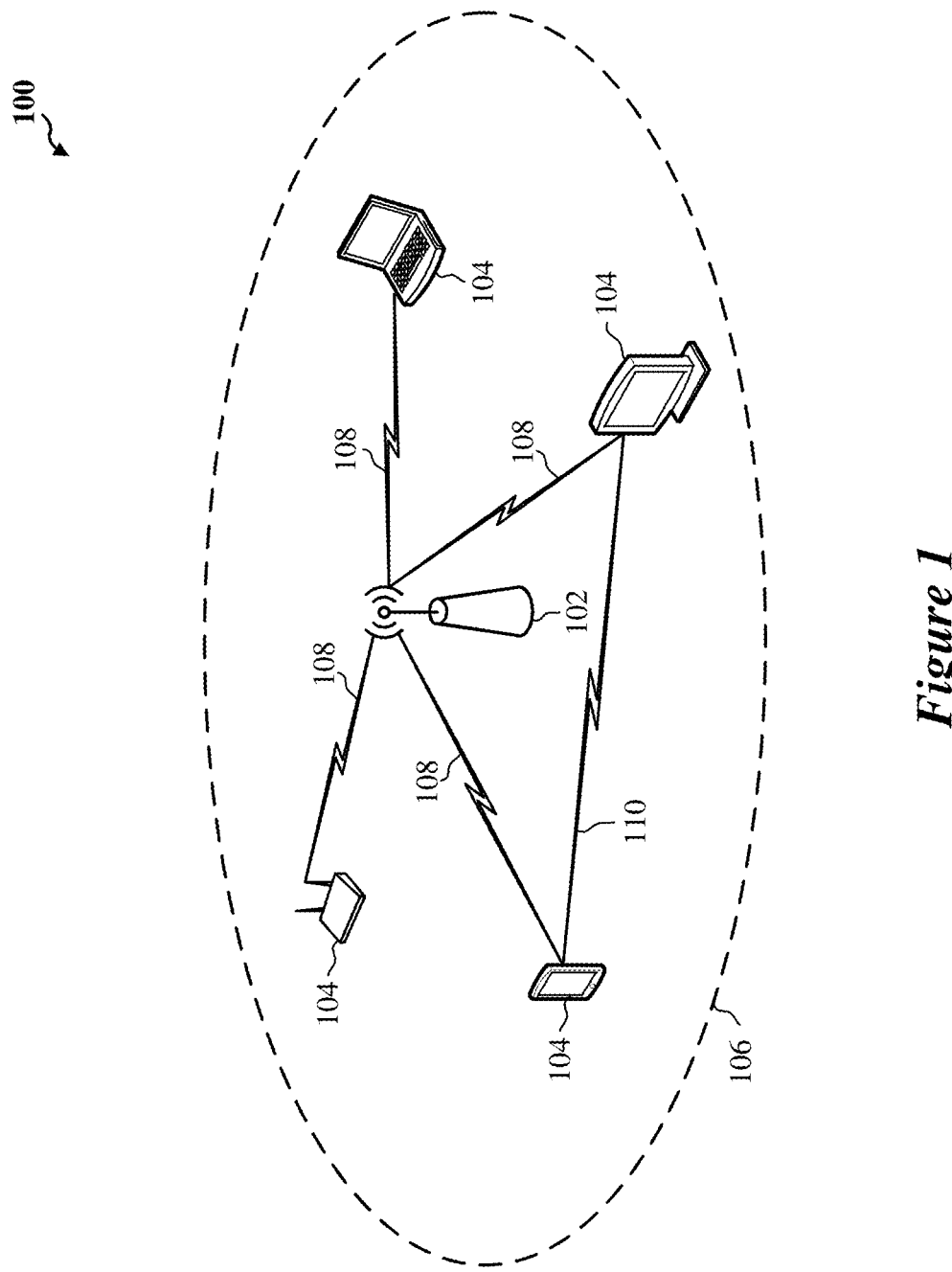
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

The IEEE 802.11be amendment of the IEEE 802.11 standard describes a restricted target wake time (r-TWT) service period (SP) that can be allocated for latency-sensitive traffic. As used herein, the term "non-legacy STA" refers to any wireless station (STA) that supports the IEEE 802.11be amendment, or future generations, of the IEEE 802.11 standard, while the term "low-latency STA" refers to any non-legacy STA that has latency-sensitive traffic to send or receive. In contrast, the term "legacy STA" may refer to any STA that only supports the IEEE 802.11ax, or earlier generations, of the IEEE 802.11 standard. Non-legacy STAs that support r-TWT operation and acquire transmit opportunities (TXOPs) outside of an r-TWT SP must terminate their respective TXOPs before the start of any r-TWT SP for which they are not a member. As such, r-TWT SPs can provide more predictable latency, reduced worst case latency, or reduced jitter, with higher reliability for latency-sensitive traffic.

Aspects of the present disclosure recognize that the benefits of r-TWT operation may depend on the ability of STAs operating on a communication link to obtain accurate timing information of the AP responsible for scheduling r-TWT SPs on the communication link. For example, to avoid accessing the communication link during an r-TWT SP associated with a given communication link, a non-member STA should be configured with information indicating (with relative accuracy) the start time of the r-TWT SP. According to existing versions of the IEEE 802.11 standard, the start time of an r-TWT SP is expressed as an integer value associated with a timing synchronization function (TSF) timer of the AP (or BSS) that schedules the r-TWT SP. The AP broadcasts beacon frames carrying the current value of the TSF timer based on scheduled Target Beacon Transmission Times (TBTTs). STAs (and other APs) that receive the beacon frames may use the current TSF value to synchronize the STAs' respective local TSF timers.

Imperfections in the clocks used by the AP and the AP's associated STAs (and the other APs) to implement the associated STAs' their respective TSF timers can lead to clock drift between the AP and the associated STAs. TSF offsets between the AP and the AP's associated STAs resulting from clock drift can affect the accuracy with which the associated STAs estimate the start time of an r-TWT SP on the communication link. The IEEE 802.11 standard specifies a Beacon interval of 185,234,501 microseconds (ps), and allows a maximum clock drift between an AP and the AP's associated STAs of ±100 parts-per million (ppm). As such, the clock drift between an AP and the AP's associated STAs can be as much as ±20 μs per Beacon interval. STAs in a Power Save (PS) mode can remain in a sleep state during multiple Beacon intervals, and therefore may not listen for beacon frames at every TBTT. For example, a STA in PS mode associated with a Delivery Traffic Indication Map (DTIM)=4 wakes up to listen for beacon frames at every 4th TBTT, and will therefore miss 3 consecutive beacon frame transmissions during each DTIM period. As a result, the clock drift between the STA in PS mode with DTIM=4 and the STA's associated AP can be as much as ±4*20 μs=80 μs per DTIM period.

Some wireless devices may be capable of multi-link operation (MLO). An MLO-capable device may be referred to as a multi-link device (MLD). For example, an access point (AP) MLD may include a plurality of APs configured to communicate on a plurality of respective communication links with a non-AP MLD (also referred to as a "STA MLD"). Similarly, the non-AP MLD may include a plurality of STAs each configured to communicate on a respective one of the plurality of communication links associated with the AP MLD. Some non-AP MLDs may communicate with the AP MLD concurrently on each of the communication links, for example, in accordance with a multi-link multi-radio (MLMR) simultaneous transmit and receive (STR) or MLMR non-STR (NSTR) mode of operation. Other non-AP MLDs may communicate with the AP MLD on only one of the communication links at any given time, for example, in accordance with a multi-link single-radio (MLSR) or enhanced MLSR (EMLSR) mode of operation.

When the APs included in, or associated with, an AP MLD use different clocks for the APs' respective TSF timers, clock drift between the respective clocks can lead to TSF offsets between the APs of the AP MLD. The IEEE 802.11 standard allows a maximum clock drift between the APs of an AP MLD of ±30 μs. As such, for a STA in PS mode with a DTIM=4 and associated with a first AP of an AP MLD, the clock drift between the STA and other APs of the AP MLD can be as much as 30 μs+80 μs=±110 μs. Accordingly, the clock drift between the STA and other APs of the AP MLD may exceed an acceptable level when the STA relies on beacon frames communicated at the beacon interval for synchronization (especially when one or more Beacons are skipped). Therefore, there is a need to maintain stricter synchronization between a STA and an associated AP, and more particularly between a STA and each of the APs of an AP MLD, to ensure that TSF offsets between the STA and the associated AP (or each AP of the AP MLD) do not allow the STA to inadvertently continue holding a TXOP after the start time of an r-TWT SP or to inadvertently access the communication link immediately prior to the start time of the r-TWT SP due to the TSF offsets.

Implementations described herein provide an enhanced synchronization mode that allows sync messages to be communicated between an AP and STA more often than TBTTs associated with a communication link. More specifically, an device may transmit, to a STA, an indication of an enhanced synchronization mode on a first communication link associated with a first AP device. The device may then transmit, during the enhanced synchronization mode, a plurality of sync frames on the first communication link more often than TBTTs associated with the first communication link, where each of the plurality of sync frames indicating a TSF offset between the first AP and a second AP of the device. In this way, the STA may be able to maintain tighter synchronization with the AP, relative to relying on synchronization at TBTTs, to ensure (e.g., help increase the occurrences) that STAs terminate any TXOP obtained outside of an r-TWT SP prior to the start of an r-TWT SP on the communication link and/or ensure that STAs do not attempt to obtain access to a communication link immediately prior to the start of an r-TWT SP on the communication link. In this way, the enhanced synchronization mode may allow r-TWT SP operation to provide even more predictable latency, reduced worst case latency, or reduced jitter, with higher reliability for latency-sensitive traffic.

Implementations of the subject matter described in this disclosure may be used to synchronize timing between STAs and APs in a manner that may prevent STAs operating on a communication link from inadvertently interfering with one or more r-TWT SPs scheduled on the communication link. Specifically, in various implementations, a device including a first AP may establish an enhanced synchronization mode during which participating STAs receive timing information of one or more associated or nearby APs with sufficient periodicity to ensure that TSF offsets between the STAs and the APs do not exceed a value that may allow the STAs to inadvertently access or occupy a shared wireless medium during r-TWT SPs scheduled on the shared wireless medium. For example, in some implementations, the device may transmit, to one or more STAs associated with the device, an indication of an enhanced synchronization mode on a first communication link associated with a first AP of the device. In some instances, the indication may be responsive to a presence of latency-sensitive traffic on the first communication link. In some other instances, the indication may be responsive to a request from the one or more STAs. In some aspects, the indication may also indicate a start time of the enhanced synchronization mode. In other aspects, the indication may also indicate whether participation in the enhanced synchronization mode is mandatory or voluntary for each of the one or more STAs.

In some instances, the device may be an AP multi-link device (MLD) including the first AP and the second AP. The first AP may be associated with the first communication link, and the second AP may be associated with a second communication link that occupies a different frequency band than the first communication link. For example, the first communication link may be a wireless channel in one of a 2.4 GHz frequency band, a 5 GHz frequency band, or a 6 GHz frequency band, and the second communication link may be a wireless channel in another of the 2.4 GHz frequency band, the 5 GHz frequency band, or the 6 GHz frequency band.

During the enhanced synchronization mode, the device may transmit a plurality of sync frames on the first communication link more often than the TBTTs associated with the first communication link. Each of the sync frames may indicate a TSF value of the first AP and a TSF offset between the first AP and a second AP of the device. The frequency with which the sync frames are transmitted on the first communication link may be associated with a level of timing accuracy that prevents the participating STAs from occupying or accessing the first communication link during one or more r-TWT SPs scheduled on the first communication link. For example, in some instances, the sync frames may be transmitted at intervals of approximately 20 μs (although other suitable intervals may be used). STAs that participate in the enhanced synchronization mode may use the TSF information indicated in the sync frames to synchronize their respective local TSF timers with the TSF timers of the first and second APs of the device, for example, without receiving beacon frames from the second AP. In some implementations, the enhanced synchronization mode may be established in conjunction with one or more TWT SPs or r-TWT SPs on the first communication link. In some aspects, the device may reject association requests from STAs that do not support the enhanced synchronization mode during a time period that commences prior to a start time of the enhanced synchronization mode and ends at the termination of the enhanced synchronization mode.

Particular implementations of the subject matter described in this disclosure can be implemented to realize one or more of the following potential advantages. By synchronizing the TSF timer of a STA with the respective TSF timers of the first and second APs of the device more often than the TBTTs of the first and second APs, aspects of the present disclosure may decrease TSF offsets between the STA and each of the first AP and the second AP, for example, compared to STAs that rely on beacon frame transmissions to obtain TSF information of the APs. In addition, by indicating TSF offsets between the first and second APs of the device in the sync frames, aspects of the present disclosure may allow STAs operating on the first communication link to synchronize their respective TSF timers with the TSF timer of the second AP without receiving beacon frames broadcast on the second communication link by the second AP. In this way, a single-radio device, such as an MLSR device or an EMLSR device, can synchronize the device's TSF timer with the respective TSF timers of both the first and second APs of the device without switching between the first and second communication links to receive beacon frame transmissions from each of the first and second APs of the device.

Moreover, by participating in the enhanced synchronization modes disclosed herein, a STA may be able to maintain TSF offsets associated with the first and second APs of the device at or below a value associated with a level of timing accuracy to avoid inadvertently occupying or attempting to access the first communication link during one or more TWT SPs or r-TWT SPs scheduled on the first communication link. Specifically, the increased timing synchronization achieved through use of enhanced synchronization modes disclosed herein may ensure that participating STAs terminate TXOPs obtained outside of an r-TWT SP prior to the start of an r-TWT SP for which they are not members. In addition, the increased timing synchronization provided by enhanced synchronization modes disclosed herein may ensure that the participating STAs do not perform, prior to the start time of an r-TWT SP, channel access operations that may result in a TXOP that overlaps, and thus interferes with, the r-TWT SP. In this way, the enhanced synchronization modes disclosed herein may allow r-TWT SPs to provide even more predictable latency, reduced worst case latency, or reduced jitter, with higher reliability for latency-sensitive traffic.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan the STA's surroundings to find a more suitable AP 102 with which to associate. For example, a STA 104 that is moving relative to the STA's associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figures 2A, 2B:
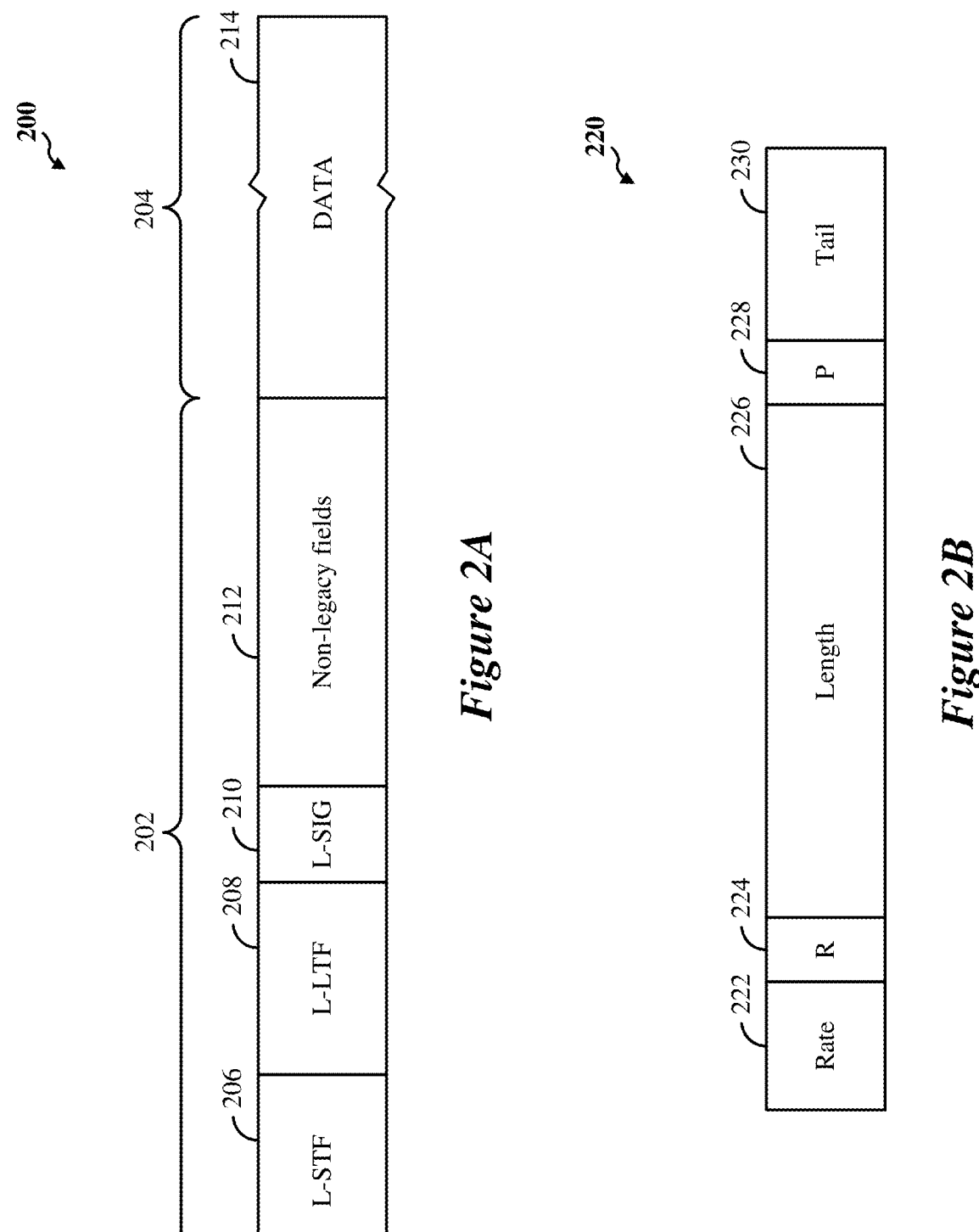
FIG. 2A shows an example protocol data unit (PDU) usable for communications between an access point (AP) and one or more wireless stations (STAs).
FIG. 2B shows an example field in the PDU of FIG. 2A.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figures 3A, 3B:
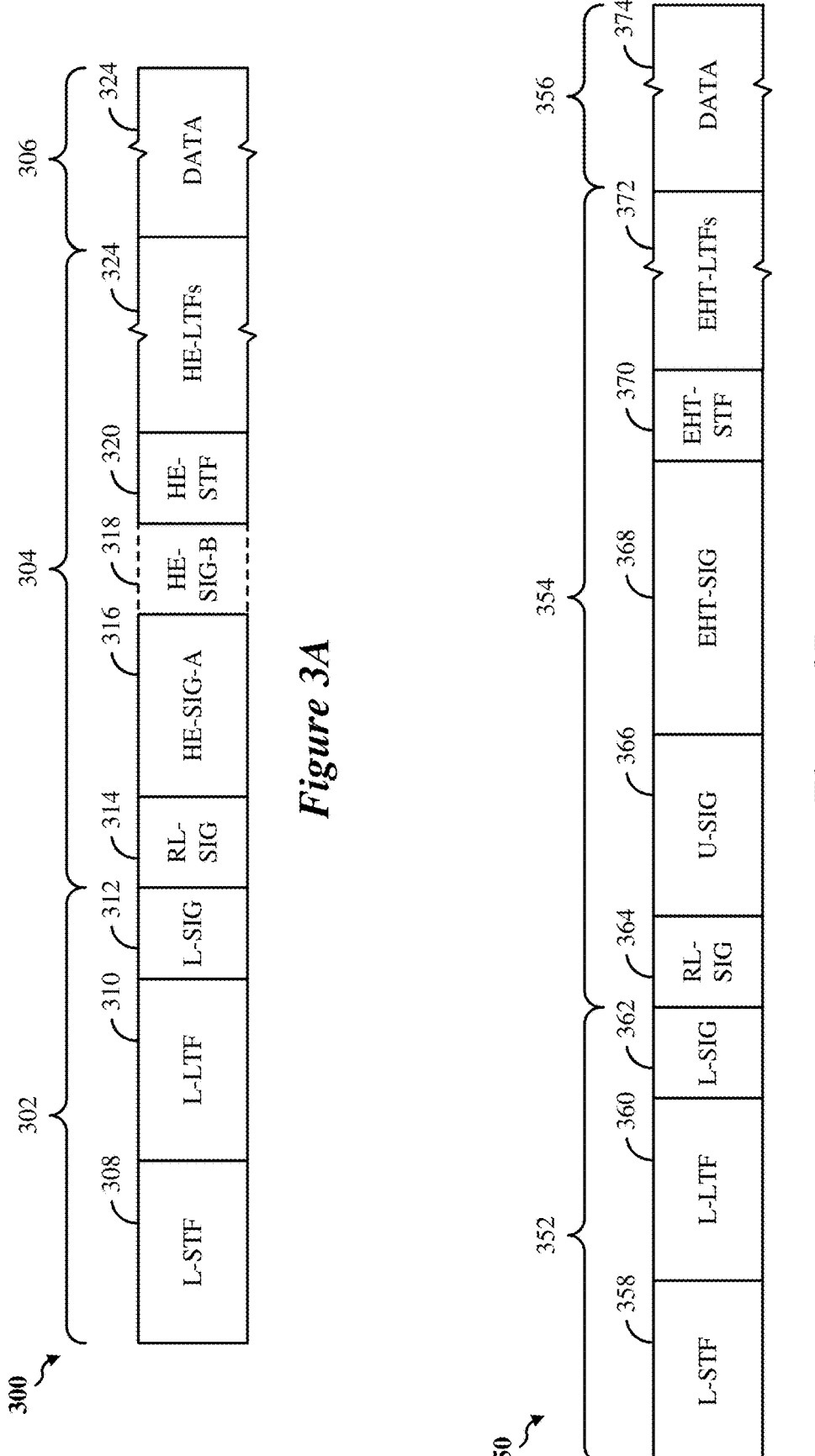
FIG. 3A shows another example PDU usable for communications between an AP and one or more STAs.
FIG. 3B shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-B 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
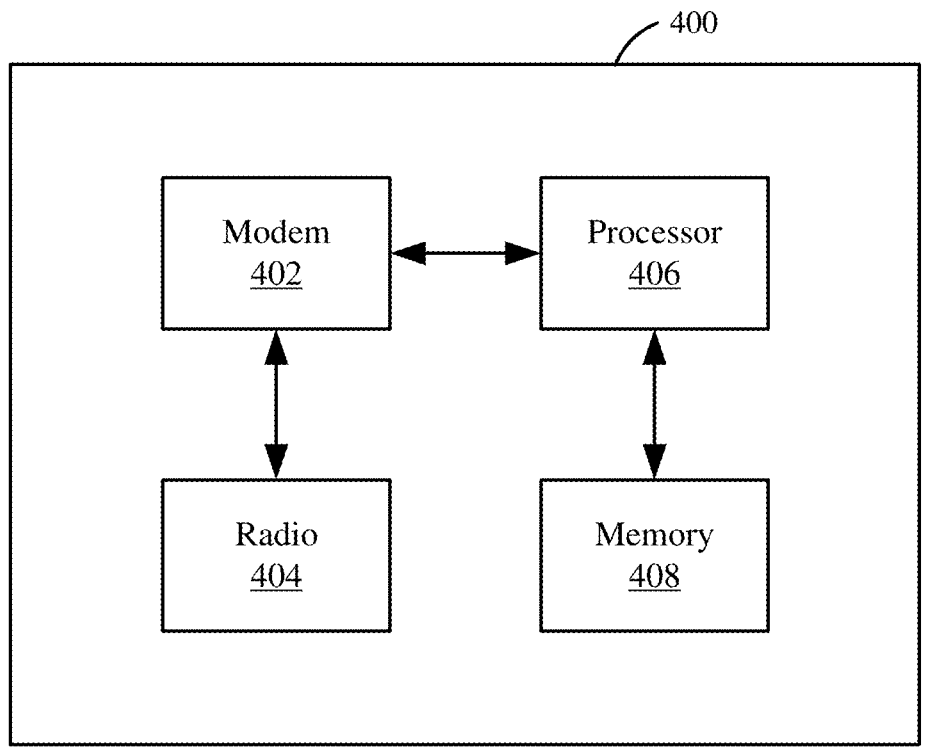
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting (or outputting for transmission) and receiving wireless communications (for example, in the form of wireless packets). For example, the wireless communication device 400 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 400 can be, or can include, a chip, system on chip (SoC), chipset, package, or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 400 further includes one or more processors, processing blocks or processing elements (collectively "the processor 406"), and one or more memory blocks or elements (collectively "the memory 408").

The modem 402 can include an intelligent hardware block or device such as, for example, an application-specific integrated circuit (ASIC) among other possibilities. The modem 402 is configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer, and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation, or interpretation.

The radio 404 includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 5B:
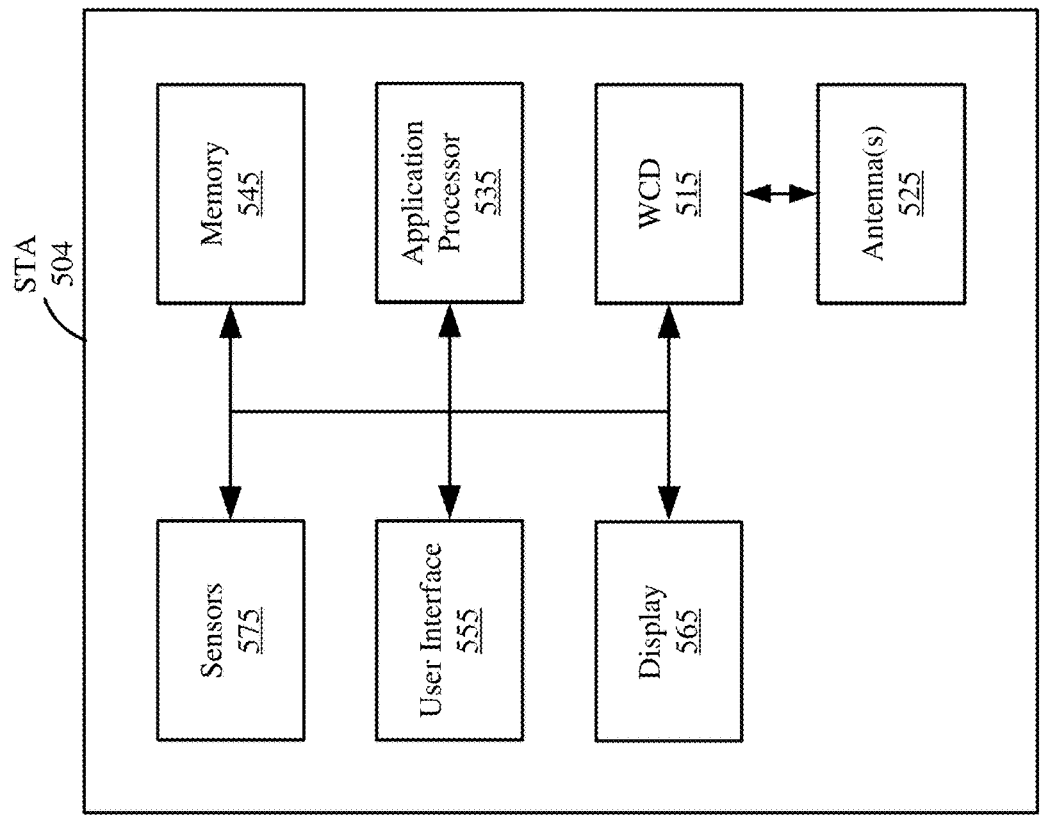
FIG. 5B shows a block diagram of an example station (STA).
Figure 5A:
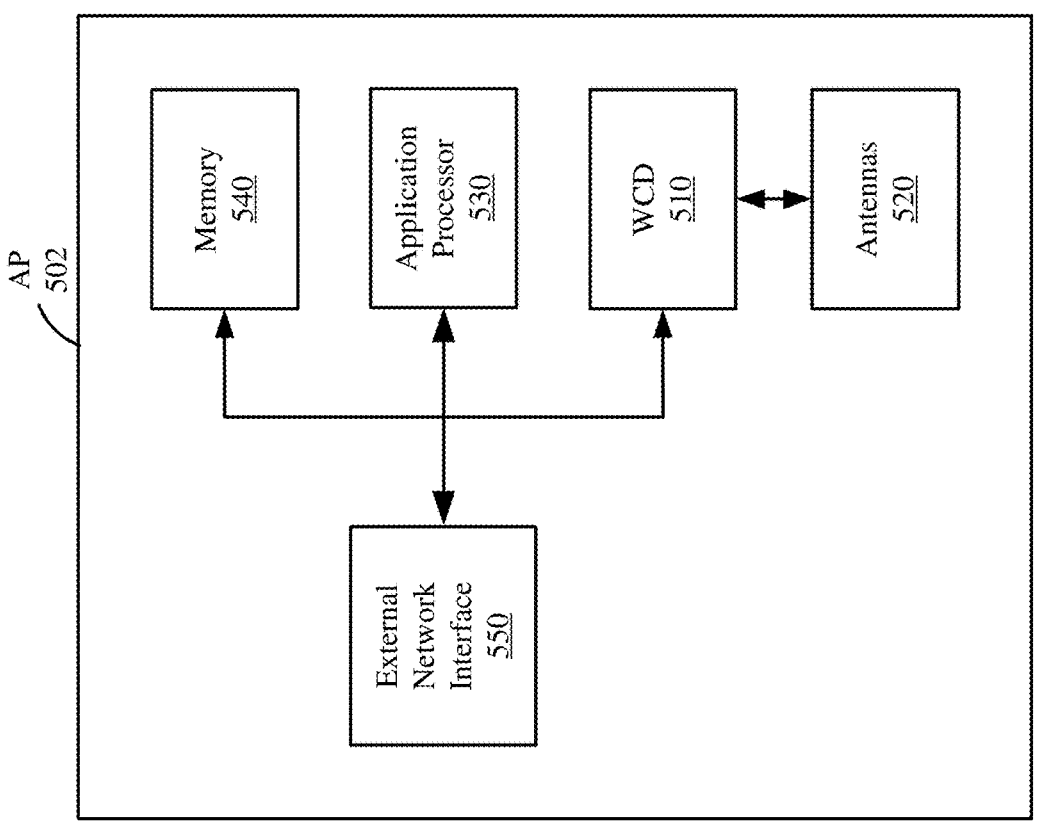
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510. For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515. For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

FIG. 6 shows an example communication system 600 that includes an AP MLD 610 and a non-AP MLD 620. In some implementations, the AP MLD 610 may be one example of any of the APs 102 of FIG. 1, the wireless communication device 400 of FIG. 4, or the AP 502 of FIG. 5. The non-AP MLD 720 may be one example of any of the STAs 104 FIG. 1, the wireless communication device 400 of FIG. 4, or the STA 504 of FIG. 5.

The AP MLD 610 includes multiple APs 612-616 associated with (or operating on) communication links 602-606, respectively. In the example of FIG. 6, the AP MLD 610 is shown to include only 3 APs. However, in some implementations, the AP MLD 610 may include fewer or more APs than those depicted in FIG. 6. Although the APs 612-616 may share a common association context (through the AP MLD 610), each of the APs 612-616 may establish a respective BSS on the AP's associated communication link. The APs 612-616 also may establish their respective communication links 602-606 on different frequency bands. For example, the AP 612 may operate on the 2.4 GHz frequency band, the AP 614 may operate on the 5 GHz frequency band, and the AP 616 may operate on the 6 GHz frequency band.

The non-AP MLD 620 includes multiple STAs 622-626 that may be configured to communicate on the communication links 602-606, respectively. Thus, the STA 622 may operate on the 2.4 GHz frequency band, the STA 624 may operate on the 5 GHz frequency band, and the STA 626 may operate on the 6 GHz frequency band. In the example of FIG. 6, the non-AP MLD 620 is shown to include only 3 STAs. However, in some implementations, the non-AP MLD 620 may include fewer or more STAs than those depicted in FIG. 6. The IEEE 802.11be amendment of the IEEE 802.11 standard defines several modes in which a non-AP MLD may operate. The various operating modes depend on the number of wireless radios associated with the non-AP MLD and the non-AP MLD's ability to communicate (such as by transmitting or receiving) concurrently on multiple communication links.

In some implementations, the non-AP MLD 620 may include a single radio or may otherwise be capable of communicating on only one link at a time. In such implementations, the non-AP MLD 620 may operate in a multi-link single-radio (MLSR) mode or an enhanced MLSR (EMLSR) mode. A non-AP MLD operating in the EMLSR mode can listen for specific types of communications (such as buffer status report poll (BSRP) frames or multi-user request-to-send (MU-RTS) frames) on multiple communication links, concurrently, but can only transmit or receive on one communication link at any given time. For example, the STAs 622 and 624 may concurrently listen on their respective links 602 and 604 during a listen interval. However, if the STA 622 detects a BSRP frame on link 602, the non-AP MLD 620 subsequently tunes each of the non-AP MLD's antennas (including the antenna used by the STA 624 during the listen interval) to operate on link 602. By contrast, a non-AP MLD operating in the MLSR mode can only listen to, and transmit or receive on, one communication link at any given time. For example, the STA 622 must be in a power save mode any time the STA 624 is active.

In some other implementations, the non-AP MLD 620 may include multiple radios and may be capable of concurrent communications on each of the links. In such implementations, the non-AP MLD 620 may operate in a multi-link multi-radio (MLMR) simultaneous transmit and receive (STR) mode or a multi-link multi-radio non-STR (NSTR) mode. A non-AP MLD operating in the MLMR STR mode can simultaneously (or concurrently) transmit and receive on multiple communication links. For example, the STA 622 may transmit or receive on link 602 while the STA 624 concurrently transmits or receives on link 604. More specifically, such communications may be asynchronous. In other words, the STA 622 may be transmitting on link 602 while the STA 624 is receiving on link 604. By contrast, a non-AP MLD operating in the MLMR NSTR mode can simultaneously transmit and receive on multiple communication links only if such communications are synchronous. For example, the STAs 624 and 626 may concurrently transmit on links 604 and 606 and may concurrently receive on links 604 and 606. However, the STA 624 cannot be transmitting on link 604 while the STA 626 is receiving on link 606.

Still further, a non-AP MLD may include multiple radios but may be capable of concurrent communications on only a subset of the links. In such implementations, the non-AP MLD 620 may operate in an enhanced MLMR (EMLMR) mode or a hybrid EMLSR mode. A non-AP MLD operating in the EMLMR mode supports MLMR STR operation between certain pairs of communication links. For example, the STAs 622 and 624 may concurrently communicate on their respective links 602 and 604 in accordance with the MLMR STR mode of operation.

Figure 7:
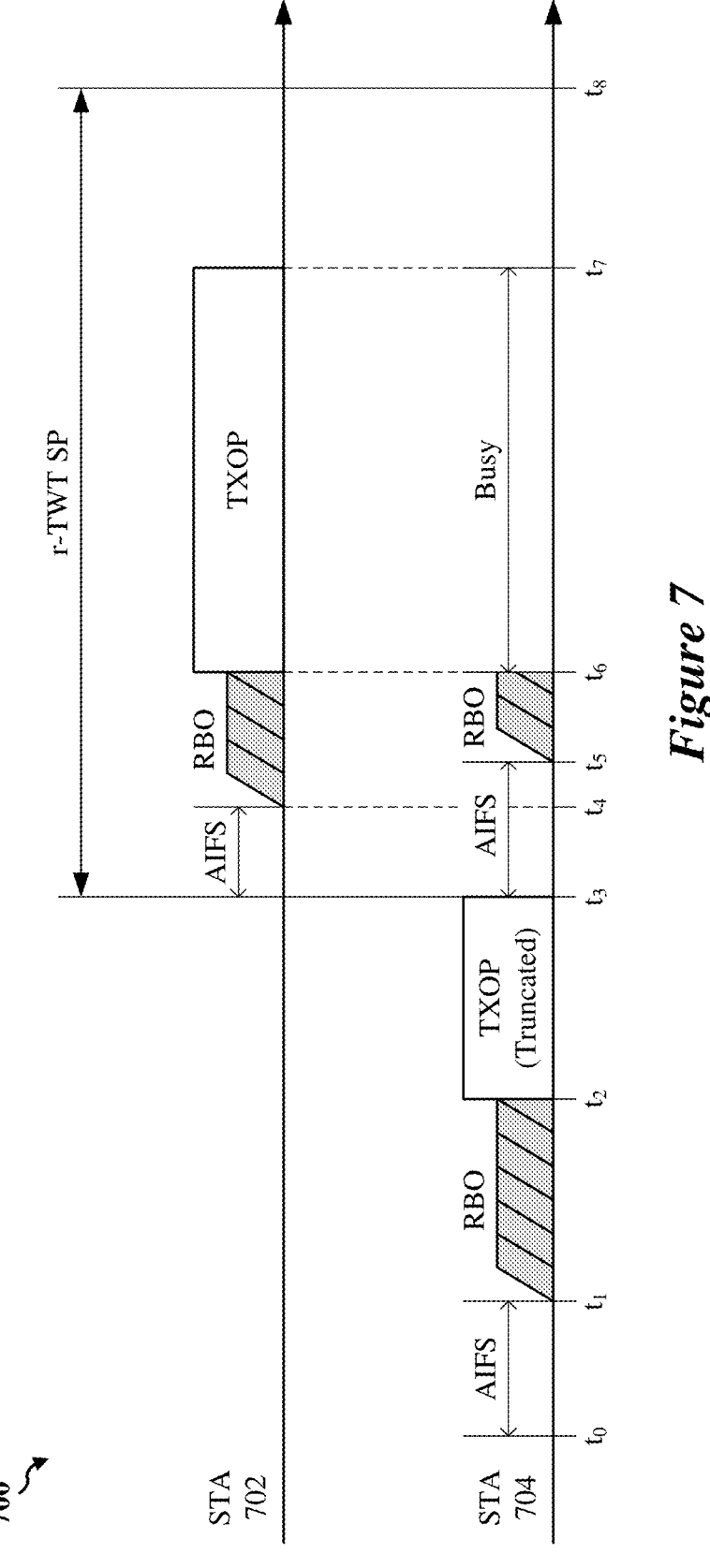
FIG. 7 shows a timing diagram depicting an example wireless communication.

FIG. 7 shows a timing diagram 700 depicting an example of wireless communication among devices belonging to a BSS. In the example of FIG. 7, the BSS may include multiple non-legacy STAs 702 and 704 that support r-TWT operation. More specifically, the STA 702 may be a low-latency STA that is a member of an r-TWT SP that spans a time period between times $t_3$ and $t_8$, whereas the STA 704 may be a non-member STA. In some implementations, each of the STAs 702 and 704 may be one example of any of the STAs 104 of FIG. 1, the wireless communication device 400 of FIG. 4, or the STA 504 of FIG. 5B. Although only two non-legacy STAs 702 and 704 are shown in the example of FIG. 7, in actual implementations, the BSS may include any number of legacy or non-legacy STAs.

The non-member STA 704 attempts to access a shared wireless channel prior to the start of the r-TWT SP at time $t_3$. More specifically, the non-member STA 704 senses that the channel is idle for a threshold duration, from times $t_0$ to $t_1$, based on a channel sensing operation (such as clear channel assessment (CCA)) and further counts down a random backoff (RBO) duration, from times $t_1$ to $t_2$, before attempting to acquire a TXOP. For example, the threshold duration (from times $t_0$ to $t_1$) may be an arbitration interframe spacing (AIFS) duration associated with a particular access category (AC) of data traffic. Accordingly, the RBO duration (from times $t_1$ to $t_2$) may be randomly selected from a range of RBOs spanning a contention window associated with the AC. At time $t_2$, the non-member STA 704 senses that the wireless channel is still idle and proceeds to acquire a TXOP, for example, by initiating a transmission over the shared channel. In the example of FIG. 7, the desired TXOP may be longer than the duration remaining before the start of the r-TWT SP at time $t_3$. However, because the existing rules regarding r-TWT operation require non-member STAs to terminate their TXOPs by the start of an r-TWT SP, the non-member STA 704 must truncate the non-member STA's TXOP between times $t_2$ to $t_3$.

The low-latency STA 702 attempts to access the shared wireless channel at the start of the r-TWT SP. In the example of FIG. 7, the low-latency STA 702 senses that the channel is idle for an AIFS duration, from times $t_3$ to $t_4$, and further counts down an RBO duration, from times $t_4$ to $t_6$, before attempting to acquire a TXOP. As shown in FIG. 7, the non-member STA 704 also attempts to access the shared wireless channel at the start of the r-TWT SP. For example, the non-member STA 704 senses that the channel is idle for an AIFS duration, from times $t_3$ to $t_5$, and further counts down an RBO duration beginning at time $t_5$. In some implementations, the data traffic associated with the low-latency STA 702 may be assigned to a higher-priority AC than the data traffic associated with the non-member STA 704. As such, the AIFS or RBO durations associated with the low-latency STA 702 may be shorter than the AIFS or RBO durations, respectively, associated with the non-member STA 704. As a result, the low-latency STA 702 wins access to the wireless channel, at time $t_6$, and acquires a TXOP, for example, by initiating a transmission over the shared channel.

The non-member STA 704 senses that the wireless channel is busy, at time $t_6$, and refrains from accessing the shared channel for the duration of the TXOP (from times $t_6$ to $t_8$). After the TXOP has terminated, at time $t_8$, the non-member STA 704 may once again attempt to access the wireless channel. In this manner, the r-TWT operation may prioritize latency-sensitive traffic in the BSS, for example, by requiring non-member STAs to terminate their TXOPs by the start of any r-TWT SPs of which they are not members. Additionally, an AP (not shown for simplicity) may suppress all traffic from legacy STAs associated with the BSS by scheduling a quiet interval to overlap with at least a portion of the r-TWT SP (such as one or more time-units (TUs) beginning at time $t_3$). For example, the duration of the quiet interval may be indicated by one or more quiet elements included in management frames (such as beacon frames or probe response frames) transmitted by the AP prior to the start of the r-TWT SP.

As discussed, aspects of the present disclosure recognize that the benefits of r-TWT operation may depend on the ability of non-legacy STAs, such as STAs 702 and 704 of FIG. 7, to obtain accurate timing information of the AP responsible for scheduling r-TWT SPs on a communication link. Specifically, to avoid interfering with an r-TWT SP scheduled on a communication link, a non-member STA must know, with relative accuracy, the start time of the r-TWT SP. However, because the start time of the r-TWT SP is expressed as an integer value based on the TSF timer of the AP that schedules the r-TWT SP on the communication link, TSF offsets between the non-member STA and the scheduling AP can cause the non-member STA to miscalculate the r-TWT SP start time and inadvertently occupy the communication link during at least a portion of the r-TWT SP.

Figures 8A, 8B:
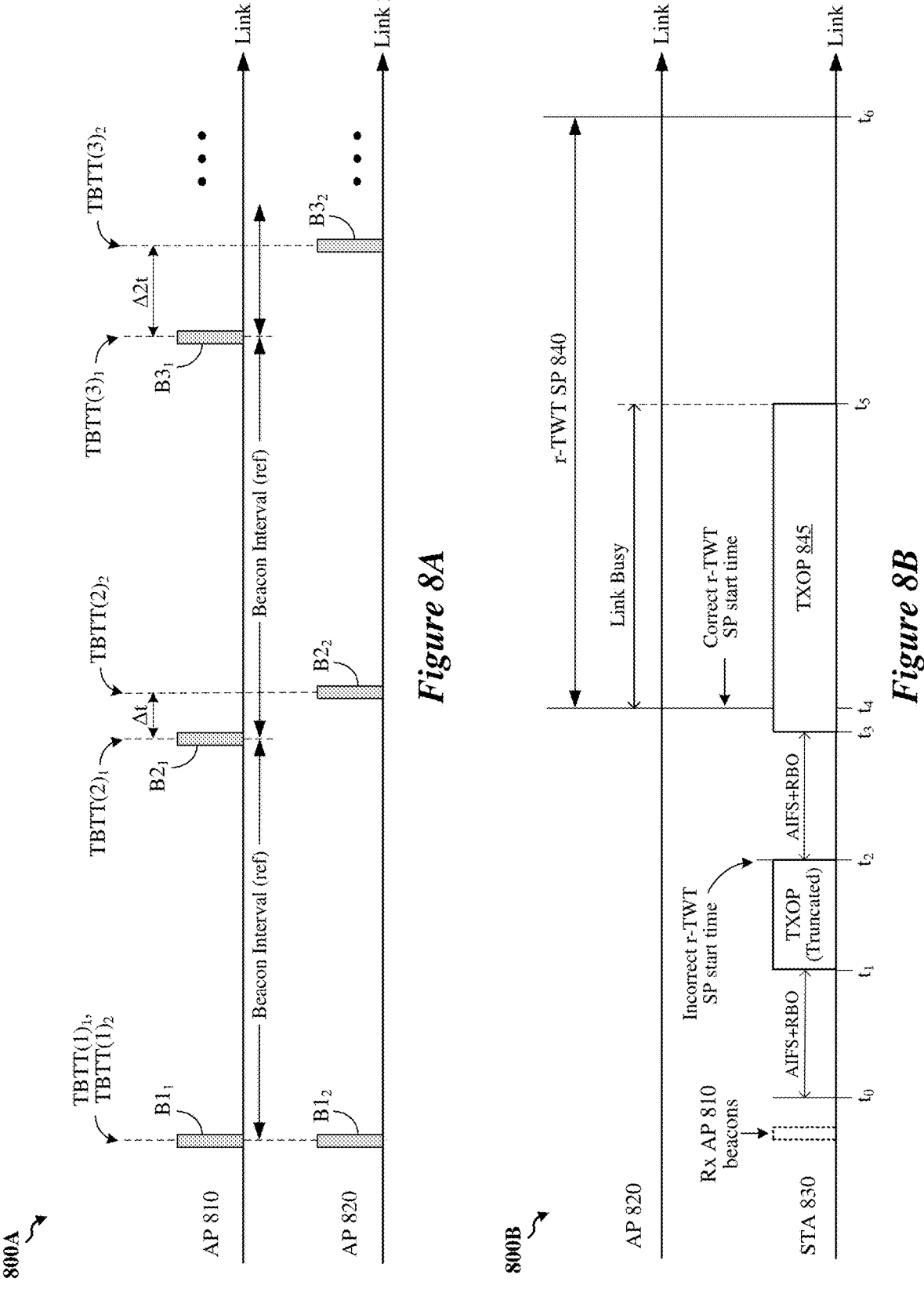
FIG. 8A shows a timing diagram depicting example beacon frame transmissions.
FIG. 8B shows a timing diagram depicting an example wireless communication between devices.

FIG. 8A shows a timing diagram 800A depicting example beacon frame transmissions. The timing diagram 800A shows a first AP 810 operating on a first communication link (link 1), and a second AP 820 operating on a second communication link (link 2). The APs 810 and 820 may be examples of the AP 102 of FIG. 1, the wireless communication device 400 of FIG. 4, the AP 502 of FIG. 5A, or the AP MLD 610 of FIG. 6. In some implementations, the APs 810 and 820 may be part of, or associated with, an AP MLD configured to communicate on a plurality of different communication links. For example, although only two APs 810 and 820 are shown in FIG. 8A for simplicity, the AP MLD may include one or more other APs configured to operate on one or more other respective communication links. In some aspects, link 1 may be a wireless channel in one of a 2.4 GHz frequency band, a 5 GHz frequency band, or a 6 GHz frequency band, and link 2 may be a wireless channel in another of the 2.4 GHz frequency band, the 5 GHz frequency band, or the 6 GHz frequency band.

The AP 810 broadcasts a plurality of first beacon frames $B1_1$-$B3_1$ on link 1 at respective times $TBTT(1)_1$-$TBTT(3)_1$, and the AP 820 broadcasts a plurality of second beacon frames $B1_2$-$B3_2$ on link 2 at respective times $TBTT(1)_2$-$TBTT(3)_2$. Each of the first beacon frames $B1_1$-$B3_1$ broadcast on link 1 may include the current TSF value of AP 810 and a TSF offset between AP 810 and AP 820, and each of the second beacon frames $B1_2$-$B3_2$ broadcast on link 2 may include the current TSF value of AP 820 and the TSF offset between AP 820 and AP 810. In some instances, the TSF timer of AP 810 may be used as a reference for TSF offsets between AP 810 and AP 820, and the beacon interval associated with AP 810 (and thus corresponding transmission times $TBTT(1)_1$-$TBTT(3)_1$) may be used as a reference for timing offsets between AP 810 and AP 820.

In the example of FIG. 8A, AP 820 has a slower clock than AP 810 (or AP 810 has a faster clock than AP 820), which may cause a continually increasing time offset between the beacon transmission times $TBTT(1)_1$-$TBTT(3)_1$ associated with AP 810 and the beacon transmission times $TBTT(1)_2$-$TBTT(3)_2$ associated with AP 820. For example, while the transmission of the first beacon frame $B1_1$ on link 1 is aligned with the transmission of the first beacon frame $B1_2$ on link 2, transmission of the second beacon frame $B2_1$ on link 1 occurs before the transmission of the second beacon frame $B2_2$ on link 2 by a time period equal to $\Delta t$, transmission of the third beacon frame $B3_1$ on link 1 occurs before the transmission of the third beacon frame $B3_2$ on link 2 by a time period equal to $\Delta 2t$, and so on. As such, the beacon transmission times $TBTT(1)_1$-$TBTT(3)_1$ associated with AP 810 may occur increasingly earlier than the beacon transmission times $TBTT(1)_2$-$TBTT(3)_2$ associated with AP 820.

FIG. 8B shows a timing diagram 800B depicting an example wireless communication between devices. The timing diagram 800B includes the AP 820 of FIG. 8A and a STA 830. The STA 830 may be any suitable device such as one or more of the STAs 104 of FIG. 1, the wireless communication device 400 of FIG. 4, the STA 504 of FIG. 5B, or the non-AP MLD 620 of FIG. 6. In some implementations, the STA 830 may be part of a non-AP MLD configured to communicate on a plurality of different communication links. For example, although only one STA 830 is shown in FIG. 8B for simplicity, the non-AP MLD may include one or more other STAs configured to operate on one or more other respective communication links.

In the example of FIG. 8B, the STA 830 operates as a non-legacy STA on link 2, and obtains TSF information from beacon frames $TBTT(1)_1$-$TBTT(3)_1$ broadcast on link 1 by the AP 810 of FIG. 8A. Specifically, the STA 830 does not listen for, and does not receive, beacon frames $TBTT(1)_2$-$TBTT(3)_2$ broadcast by AP 820 on link 2. As such, the STA 830 does not receive current TSF values of AP 820 from beacon frame transmissions, and therefore may estimate the current TSF value of AP 820 based on the current TSF value of AP 810 and the TSF offset between AP 810 and AP 820, for example, as indicated in the beacon frames $TBTT(1)_2$-$TBTT(3)_2$ broadcast on link 2 by AP 820.

The AP 820 schedules an r-TWT SP 840 on link 2 between times $t_4$ and $t_6$. In the example of FIG. 8B, the STA 830 is not a member of the r-TWT SP 840, and therefore must end any TXOP obtained outside of the r-TWT SP 840 prior to the start time of the r-TWT SP 840, for example, as specified in the 802.11be amendments to the IEEE 802.11 standard. As discussed, AP 820 has a slower clock than AP

810, and the STA 830 synchronizes the STA's local TSF timer based on the current TSF values of AP 810 obtained from the beacon frames $TBTT(1)_1$-$TBTT(3)_1$ broadcast on link 1. The TSF offsets between the STA 830 and AP 820, which include TSF offsets between the STA 830 and AP 820 as well as TSF offsets between AP 810 and AP 820, cause the STA 830 to determine a start time for the r-TWT SP 840 that is earlier than the start time determined by AP 820.

For example, after obtaining the current TSF value of AP 810 from beacon frame transmissions on link 1, the STA 830 may perform a CCA operation on link 2. Specifically, between times $t_0$ and $t_1$, the STA 830 senses that link 2 is idle for an AIFS duration and counts down an RBO duration before attempting to obtain a TXOP on link 2. At time $t_1$, the STA 830 senses that link 2 is still idle, and obtains a TXOP on link 2. The TXOP obtained by the STA 830 is longer than the duration of time remaining before the start of the r-TWT SP 840, and therefore the STA 830 must end the TXOP prior to the start of the r-TWT SP 840 on link 2. As discussed, TSF offsets between the STA 830 and the AP 820 cause the STA 830 to incorrectly determine that the start time of the r-TWT SP 840 occurs at time $t_2$, rather than at the correct start time occurring at time $t_4$. As a result, the STA 830 ends the TXOP early, at time $t_2$.

The existing rules regarding r-TWT SPs allow non-member STAs, such as the STA 830, to access the communication link prior to the start time of an r-TWT SP, for example, as long as the non-member STA ends any obtained TXOP before the start of the r-TWT SP. In the example of FIG. 8B, after ending the TXOP early at time $t_2$, the STA 830 senses that link 2 is idle for an AIFS+RBO duration between times $t_2$ and $t_3$, and obtains another TXOP 845 on link 2 at time $t_3$. As discussed, the STA 830 determines that the r-TWT SP 840 starts at time $t_2$ (rather than at time $t_4$), and does not end the TXOP 840. As shown, the TXOP 845 spans a duration between times $t_3$ and $t_5$, thereby preventing any member STAs from accessing link 2 during at least a portion of the r-TWT SP 840.

Figures 8C, 8D:
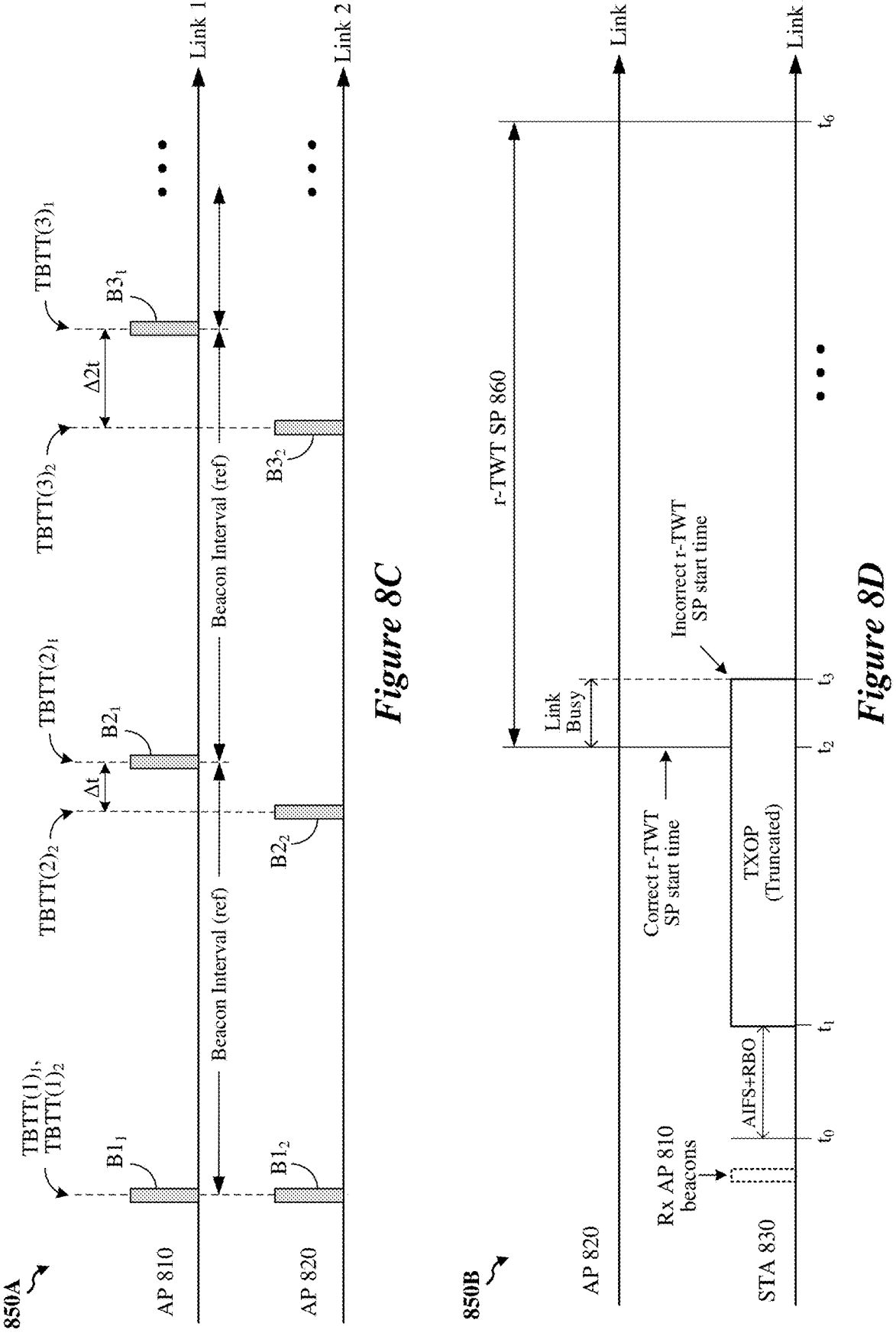
FIG. 8C shows another timing diagram depicting example beacon frame transmissions.
FIG. 8D shows another timing diagram depicting an example wireless communication between devices.

FIG. 8C shows another timing diagram 850 depicting example beacon frame transmissions. The timing diagram 850 shows the APs 810 and 820 of FIG. 8A broadcasting beacon frames on link 1 and link 2, respectively. Specifically, AP 810 broadcasts beacon frames $B1_1$-$B3_1$ on link 1 at respective times $TBTT(1)_1$-$TBTT(3)_1$, and AP 820 broadcasts beacon frames $B1_2$-$B3_2$ on link 2 at respective times $TBTT(1)_2$-$TBTT(3)_2$. Each of the beacon frames $B1_1$-$B3_1$ broadcast on link 1 may include the current TSF value of AP 810 and a TSF offset between AP 810 and AP 820, and each of the beacon frames $B1_2$-$B3_2$ broadcast on link 2 may include the current TSF value of AP 820 and the TSF offset between AP 820 and AP 810. As discussed, the TSF timer of AP 810 may be used as a reference for TSF offsets between AP 810 and AP 820, and the beacon interval associated with AP 810 (and thus corresponding transmission times $TBTT(1)_1$-$TBTT(3)_1$) may be used as a reference for timing offsets between AP 810 and AP 820.

In the example of FIG. 8C, AP 820 has a slower clock than AP 810 (or AP 810 has a faster clock than AP 820), which may cause the beacon transmission times $TBTT(1)_1$-$TBTT(3)_1$ associated with AP 810 to occur at increasingly later times than corresponding beacon transmission times $TBTT(1)_2$-$TBTT(3)_2$ associated with AP 820. For example, while the respective transmissions of the first beacon frame $B1_1$ on link 1 and the first beacon frame $B1_2$ on link 2 are aligned with each other (and thus have the same TBTT), transmission of the second beacon frame $B2_2$ on link 2 occurs before the transmission of the second beacon frame $B2_1$ on link 1 by an offset amount=$\Delta t$, transmission of the third beacon frame $B3_2$ on link 2 occurs before the transmission of the third beacon frame $B3_1$ on link 1 by an offset amount=$\Delta 2t$, and so on. As such, the second beacon transmission time $TBTT(2)_1$ associated with link 1 occurs a time period equal to $\Delta t$ after the corresponding second beacon transmission time $TBTT(2)_2$ associated with link 2, and the third beacon transmission time $TBTT(3)_1$ associated with link 1 occurs a time period equal to $\Delta 2t$ after the corresponding third beacon transmission time $TBTT(3)_2$ associated with link 2.

FIG. 8D shows a timing diagram 850B depicting an example wireless communication between devices. The timing diagram 850B includes the AP 820 of FIG. 8C and the STA 830. As discussed, the STA 830 operates as a non-legacy STA on link 2, and obtains TSF information from beacon frames $TBTT(1)_1$-$TBTT(3)_1$ broadcast on link 1 by AP 810. The STA 830 does not receive current TSF values of AP 820 from beacon frame transmissions, and instead estimates the current TSF value of AP 820 based on the current TSF value of AP 810 and the TSF offset between AP 810 and AP 820, for example, as indicated in the beacon frames $TBTT(1)_2$-$TBTT(3)_2$ broadcast on link 2 by AP 820.

The AP 820 schedules an r-TWT SP 860 on link 2 between times $t_2$ and $t_6$. In the example of FIG. 8D, the STA 830 is not a member of the r-TWT SP 860, and therefore must end any TXOP obtained outside of the r-TWT SP 860 prior to the start time of the r-TWT SP 860. As discussed, AP 810 has a slower clock than AP 820, and the STA 830 synchronizes the STA's local TSF timer based on the current TSF values of AP 810 obtained from the beacon frames $TBTT(1)_1$-$TBTT(3)_1$ broadcast on link 1. The TSF offsets between the STA 830 and the AP 820 cause the STA 830 to determine a start time for the r-TWT SP 860 that is later than the start time determined by AP 820.

For example, after obtaining the current TSF value of AP 810 from beacon frame transmissions on link 1, the STA 830 may perform a CCA operation on link 2. Specifically, between times $t_0$ and $t_1$, the STA 830 senses that link 2 is idle for an AIFS duration and counts down an RBO duration before attempting to obtain a TXOP on link 2. At time $t_1$, the STA 830 senses that link 2 is still idle, and obtains a TXOP on link 2. The TXOP obtained by the STA 830 is longer than the duration of time remaining before the start of the r-TWT SP 860, and therefore the STA 830 ends the TXOP at time $t_3$ in an effort to comply with existing rules regarding r-TWT operation. However, because AP 810 has a slower clock than AP 820, the start time of the r-TWT SP 860 estimated by STA 830, time $t_3$, occurs after the correct start time of the r-TWT SP 860, at time $t_2$. Thus, although the STA 830 ends the TXOP early, the TXOP held by the STA 830 overlaps with the r-TWT SP 860 between times $t_2$ and $t_3$, thereby preventing any member STAs from accessing link 2 during at least the portion of the r-TWT SP 860 spanning from time $t_2$ to $t_3$. Thus, as discussed above, there is a need to maintain stricter synchronization between an AP and the AP's associated STAs, and more particularly between STAs and the APs of an AP MLD, to ensure that TSF offsets resulting from clock drift do not cause non-member STAs to hold a TXOP, or attempt to obtain a TXOP, during r-TWT SPs scheduled on a shared wireless medium.

Implementations of the subject matter described in this disclosure may be used to synchronize timing between STAs and APs in a manner that may prevent STAs operating on a communication link from inadvertently interfering with one or more r-TWT SPs scheduled on the communication link. Specifically, in various implementations, a device including a first AP may establish an enhanced synchronization mode during which participating STAs receive timing information of one or more associated or nearby APs with sufficient periodicity to ensure that TSF offsets between the STAs and the APs do not exceed a value that may allow the STAs to inadvertently access or occupy a shared wireless medium during r-TWT SPs scheduled on the shared wireless medium. For example, in some implementations, the device may transmit, to one or more STAs associated with the device, an indication of an enhanced synchronization mode on a first communication link associated with a first AP of the device. In some instances, the indication may be responsive to a presence of latency-sensitive traffic on the first communication link. In some other instances, the indication may be responsive to a request from the one or more STAs. In some aspects, the indication may also indicate a start time of the enhanced synchronization mode. In other aspects, the indication may also indicate whether participation in the enhanced synchronization mode is mandatory or voluntary for each of the one or more STAs.

During the enhanced synchronization mode, the device may transmit a plurality of sync frames on the first communication link more often than the TBTTs associated with the first communication link. Each of the sync frames may indicate a TSF value of the first AP and a TSF offset between the first AP and a second AP of the device. The frequency with which the sync frames are transmitted on the first communication link may be associated with a level of timing accuracy that prevents the participating STAs from occupying or accessing the first communication link during one or more r-TWT SPs scheduled on the first communication link. For example, in some instances, the sync frames may be transmitted at intervals of approximately 20 $\mu s$ (although other suitable intervals may be used). STAs that participate in the enhanced synchronization mode may use the TSF information indicated in the sync frames to synchronize their respective local TSF timers with the TSF timers of the first and second APs of the device, for example, without receiving beacon frames from the second AP. In some implementations, the enhanced synchronization mode may be established in conjunction with one or more TWT SPs or r-TWT SPs on the first communication link. In some aspects, the device may reject association requests from STAs that do not support the enhanced synchronization mode during a time period that commences prior to a start time of the enhanced synchronization mode and ends at the termination of the enhanced synchronization mode.

Figure 9:
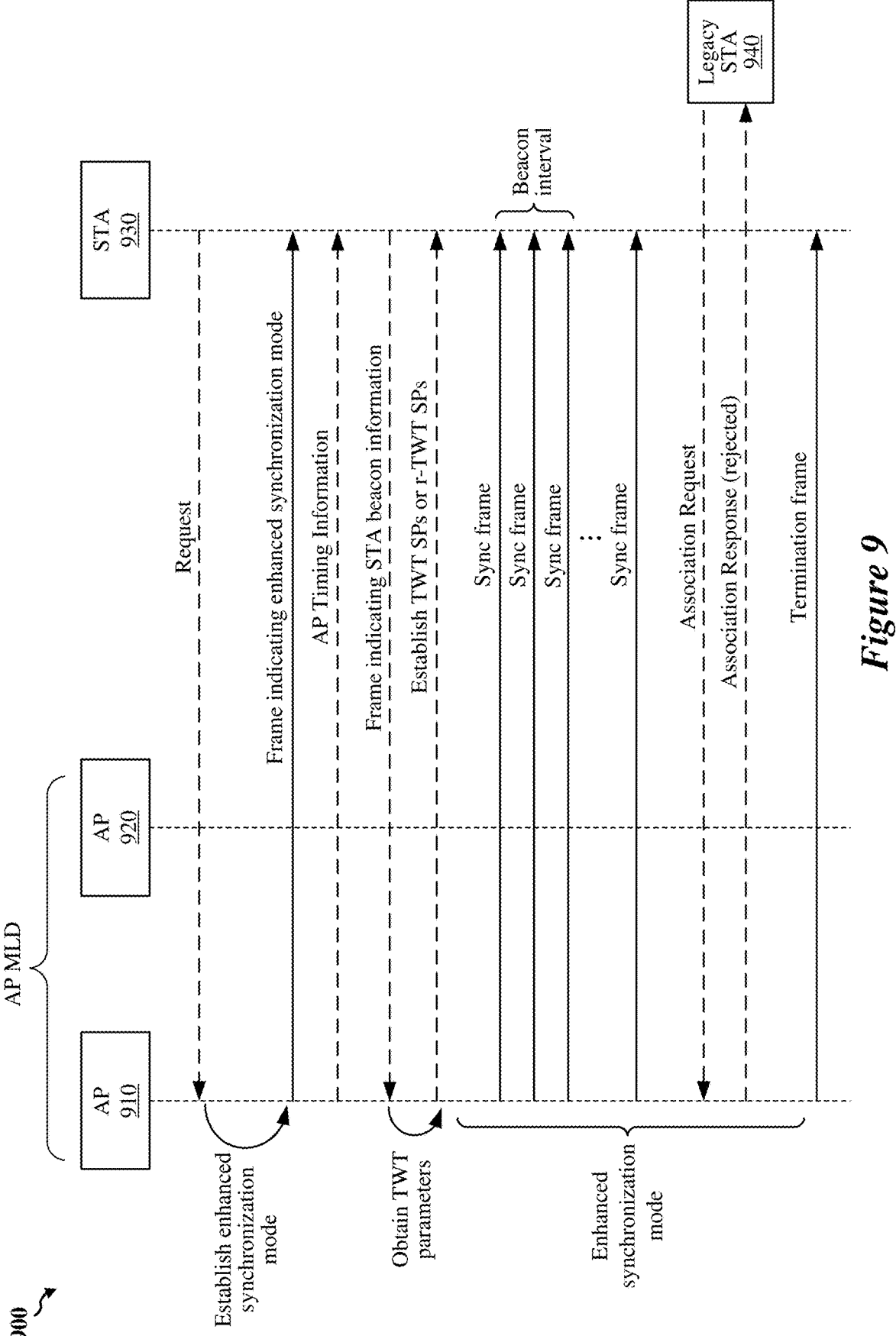
FIG. 9 shows a sequence diagram depicting an example wireless communication that supports an enhanced synchronization mode, according to some implementations.

FIG. 9 shows a sequence diagram depicting an example wireless communication 900 that supports an enhanced synchronization mode, according to some implementations. The wireless communication device 900 may be performed between AP 910, AP 920, and STA 930. The APs 910 and 920 may be part of, or associated with, an AP MLD configured to communicate on a plurality of different communication links. Specifically, AP 910 may be configured to operate on a first communication link, and AP 920 may be configured to operate on a second communication link that is different from the first communication link. In some instances, the first communication link may be a wireless channel in one of a 2.4 GHz frequency band, a 5 GHz frequency band, or a 6 GHz frequency band, and the second communication link may be a wireless channel in another of the 2.4 GHz frequency band, the 5 GHz frequency band, or the 6 GHz frequency band.

In some implementations, the APs 910 and 920 may be examples of the AP 102 of FIG. 1, the wireless communication device 400 of FIG. 4, the AP 502 of FIG. 5A, or the AP MLD 610 of FIG. 6, and the STA 930 may be an example of any of the STAs 104 of FIG. 1, the wireless communication device 400 of FIG. 4, the STA 504 of FIG. 5B, or the non-AP MLD 620 of FIG. 6. Although not shown for simplicity, the STA 930 may be part of, or associated with, a STA MLD that includes one or more other STAs that can operate on one or more other communication links of the AP MLD.

In the example of FIG. 9, the AP 910 establishes or schedules an enhanced synchronization mode for STAs operating on the first communication link, and the STA 930 operates as a non-legacy STA that supports r-TWT SP operation. The AP 910 transmits, to the STA 930, a frame carrying an indication of an enhanced synchronization mode on the first communication link. The frame may be one or more of a beacon frame, a probe response frame, a broadcast action frame, or a Target Wake Time (TWT) response frame transmitted on the first communication link. In some implementations, the frame may also indicate whether participation in the enhanced synchronization mode is mandatory or voluntary for the STA 930 (and for other STAs associated with the first communication link). For example, in some instances, the AP 910 may obtain TSF offsets between the AP's TSF timer and the respective TSF timers of a plurality of STAs operating on the first communication link (including the STA 930), and may determine whether participation in the enhanced synchronization mode is mandatory or voluntary based at least in part on the TSF offsets. In some aspects, whether participation in the enhanced synchronization mode is mandatory or voluntary for at least some STAs may also be based on an indication of latency-sensitive traffic on the first communication link. For example, when there is a presence of latency-sensitive traffic on the first communication link, the AP 910 may be more likely to deem participation in the enhanced synchronization mode mandatory.

The AP 910 may also indicate a start time of the enhanced synchronization mode to the STA 930. In some aspects, the indicated start time may be carried in one or more of a beacon frame, a probe response frame, a broadcast action frame, or a TWT response frame transmitted on the first communication link. The STA 930 receives the indications of the enhanced synchronization mode, the start time of the enhanced synchronization mode, and whether participation of the STA 930 in the enhanced synchronization mode is mandatory or voluntary. Based on the indication of the enhanced synchronization mode, STA 930 may monitor for and/or prepare to receive a plurality of sync frames on the first communication link more often than the TBTTs associated with the first communication link. STA 930 may start monitoring for and/or preparing to receive the plurality of sync frames (e.g., enter or initiate the enhanced synchronization mode) based on the start time of the enhanced synchronization mode indicated by the AP 910. When participation of the STA 930 in the enhanced synchronization mode is mandatory, the STA 930 may prepare to receive the plurality of sync frames transmitted on the first communication link, for example, and adjust the STA's local TSF timer based on the received TSF information. When participation of the STA 930 in the enhanced synchronization mode is voluntary, the STA 930 may participate in the enhanced synchronization mode, for example, based on one or more of a presence of latency-sensitive traffic on one or more communication links, an indication that the STA 930 is to receive or be associated with latency-sensitive traffic, an indication that the TSF offset between the STA 930 and the AP 910 is greater than a first amount, or an indication that the TSF offset between the STA 930 and the AP 920 is greater than a second amount, the second amount being different than the first amount.

In some instances, the AP 910 may indicate, to the STA 930, whether or not the APs 910 and 920 share a common clock or a common TSF value across the APs 910 and 920. In some aspects, the indication of the common clock or the common TSF value is carried in one or more of a beacon frame, a probe response frame, a broadcast action frame, or the sync frames. The STA 930 receives the indication, and may determine whether or not timing synchronization with the AP 920 is needed. For example, if the APs 910 and 920 share the same clock or share the same TSF value, then timing synchronization with both APs 910 and 920 may be achieved based on synchronization between the respective TSF values of AP 910 and STA 930. For another example, if the APs 910 and 920 do not share the same clock or share the same TSF value, then the STA 930 may voluntarily participate in the enhanced synchronization mode, for example, to ensure that TSF offsets between the STA 930 and each of the first and second APs 910 and 920 are less than a value.

During the enhanced synchronization mode, the AP 910 transmits a plurality of sync frames on the first communication link more often than the TBTTs associated with the first communication link, for example, such that multiple sync frames may be transmitted to the STA 930 during each beacon interval of the AP 910. In various implementations, the sync frames may be FILS Discovery frames that can be transmitted on the first communication link at a data rate that is greater than a Basic data rate associated with beacon frame transmissions from the AP 910. In some aspects, the AP 910 may transmit the sync frames on the first communication link at intervals of approximately 20 milliseconds. In other aspects, the AP 910 may transmit the sync frames on the first communication link at other suitable intervals shorter than the beacon interval of the AP 910. In some implementations, the AP 910 may establish the enhanced synchronization mode in conjunction with one or more TWT SPs or one or more r-TWT SPs scheduled on the first communication link.

In some implementations, each of the sync frames may indicate a TSF offset between AP 910 and AP 920, for example, so that the STA 930 can synchronize the STA's TSF timer with the current TSF values of the AP 910 and the AP 920. In some aspects, each of the plurality of sync frames may also indicate the TSF value of the AP 910. In some instances, the AP 910 may transmit the indication of the enhanced synchronization mode in response to a presence of latency-sensitive traffic on the first communication link. In other instances, the AP 910 may transmit the indication of the enhanced synchronization mode in response to a request from the STA 930 (or one or more other STAs associated with the first communication link).

In various aspects, the AP 910 may reject association requests from legacy STAs 940 that do not support the enhanced synchronization mode during a time period that commences prior to a start time of the enhanced synchronization mode and ends at or after termination of the enhanced synchronization mode. For example, when the legacy STA 940 transmits, to the AP 910, an association request frame including a request for the AP 910 to perform association and authentication operations with the legacy STA 940, the AP 910 responds by transmitting, to the legacy STA 940, an association response frame carrying a rejection of the association request. In this way, the AP 910 may prevent legacy devices from gaining access to the first communication link during the enhanced synchronization mode. Rejecting such association requests during the enhanced synchronization mode may also prevent legacy devices that do not support r-TWT operation from attempting to obtain a TXOP that could interfere with r-TWT SPs scheduled on the first communication link.

In some implementations, the STA 930 may transmit, to the AP 910, a frame indicating one or more of an amount of clock drift between the at least one STA and the first AP during each beacon interval, whether the at least one STA is participating in the enhanced synchronization mode, whether the at least one STA receives beacon frames on the first communication link or on a second communication link associated with the second AP, or a frequency with which the at least one STA receives beacon frames indicating TSF information of the first AP. The AP 910 receives the frame, and may establish one or more TWT SPs or one or more r-TWT SPs for latency-sensitive traffic on the first communication link based at least in part on the one or more indications received from the at least one STA In some instances, the AP 910 may terminate the enhanced synchronization mode responsive to an indication of timing synchronization between the first AP and each of a plurality of STAs participating in the enhanced synchronization mode. In some instances, one or more of the plurality of STAs may send the indication of timing synchronization to the AP 910. In some aspects, termination of the enhanced synchronization mode may be further based on an indication of timing synchronization between the second AP and each of the plurality of STAs participating in the enhanced synchronization mode.

Figure 10:
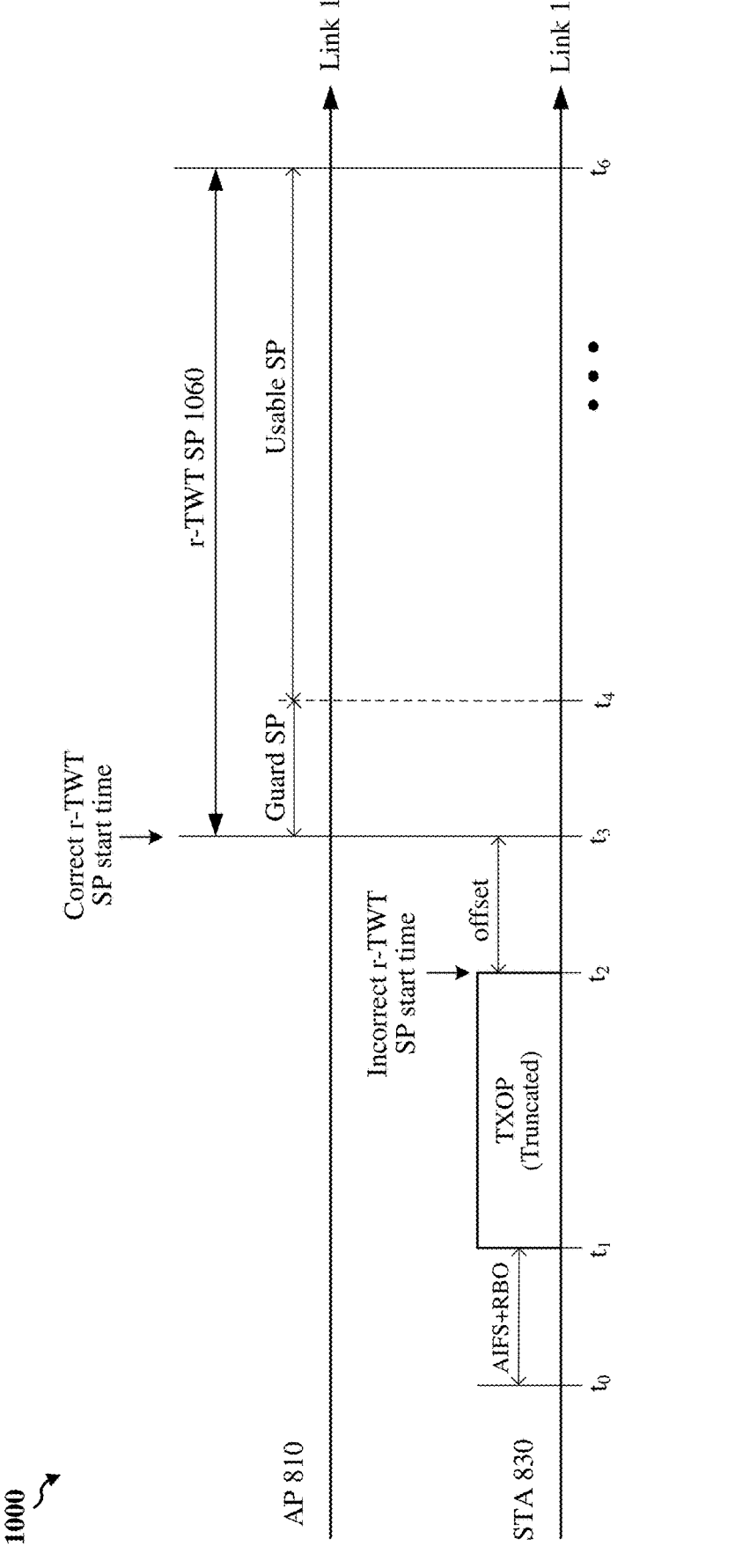
FIG. 10 shows a timing diagram depicting an example wireless communication that supports an enhanced synchronization mode, according to some implementations.

FIG. 10 shows a timing diagram depicting an example wireless communication 1000 that supports an enhanced synchronization mode, according to some other implementations. The timing diagram 1000 includes the AP 810 and the STA 830 described with reference to FIGS. 8A-8B. As discussed, TSF offsets between the STA 830 and the AP 810 resulting from clock drift may cause the STA to incorrectly estimate the start time of an r-TWT SP 1060 as time $t_2$ rather than the correct start time $t_3$. In some implementations, the AP 810 may obtain a time period associated with the TSF offset (e.g., the time offset between times $t_2$ and $t_3$), and may schedule a guard SP at the beginning of the r-TWT SP 1060. Specifically, the guard SP may span a time period between time $t_3$ and $t_4$, for example, to prevent the STA 830 from attempting to access link 1 during the r-TWT SP 1060. For example, the non-member STA 830 senses that link 1 is idle for an AIFS duration and counts down an RBO duration from times $t_0$ to $t_1$ before attempting to obtain a TXOP. At time $t_1$, the non-member STA 830 senses that link 1 is still idle, and obtains a TXOP on link 1. In the example of FIG. 8B, the TXOP obtained by the non-member STA 830 may be longer than the duration remaining before the start of the r-TWT SP 860, and the non-member STA 830 ends the TXOP at time $t_3$ in an effort to comply with existing rules regarding r-TWT operation. However, because the clock of AP 810 is faster than the clock of AP 820, the start time $t_3$ of the r-TWT SP 860 as estimated by the non-member STA 830 occurs after the correct start time $t_4$ of the r-TWT SP 860. Specifically, the TXOP truncated by the non-member STA 830 extends into a portion of the r-TWT SP 860 from time $t_2$ to $t_3$, thereby preventing any member STAs from accessing link 1 during at least the portion of the r-TWT SP 860 spanning from time $t_2$ to $t_3$.

FIG. 11 shows a flowchart illustrating an example operation 1100 for wireless communication that supports an enhanced synchronization mode, according to some implementations. The operation 1100 may be performed by wireless device such as the wireless communication device 400 described above with reference to FIG. 4. In some instances, the operation 1100 may be performed by a wireless device operating as or within an AP, such as the AP 102 of FIG. 1, the wireless communication device 400 of FIG. 4, the AP 502 of FIG. 5A, or the AP MLD 610 of FIG. 6.

For example, at 1102, the device transmits, to at least one wireless station (STA), an indication of an enhanced synchronization mode on a first communication link associated with a first access point (AP) of the device. At 1104, the device transmits, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) value of the first AP and a TSF offset between the first AP and a second AP of the device. In some instances, the indication may be carried in one or more of a beacon frame, a probe response frame, a broadcast action frame, or a Target Wake Time (TWT) response frame transmitted on the first communication link. In some aspects, a time period between successive transmissions of the sync frames may be approximately 20 milliseconds. In other aspects, the plurality of sync frames may be transmitted at a data rate that is greater than a Basic data rate associated with beacon frame transmissions on the first communication link.

In some implementations, the device may be an AP multi-link device (MLD) including the first AP and the second AP, the first AP associated with the first communication link, the second AP associated with a second communication link occupying a different frequency band than the first communication link. In some instances, at least one of the plurality of sync frames may be a Fast Initial Link Setup (FILS) Discovery frame carrying a TSF value of the first AP and a TSF offset value of the second AP. In various aspects, the indication of the enhanced synchronization mode may be transmitted based on an indication of latency-sensitive traffic on at least the first communication link. In some aspects, the enhanced synchronization mode may be established in conjunction with one or more TWT Service Periods (SPs) or one or more restricted TWT (r-TWT) SPs scheduled on the first communication link.

FIG. 12 shows a flowchart illustrating an example operation 1200 for wireless communication that supports an enhanced synchronization mode, according to some implementations. The operation 1200 may be performed by wireless device such as the wireless communication device 400 described above with reference to FIG. 4. In some instances, the operation 1200 may be performed by a wireless device operating as or within an AP, such as the AP 102 of FIG. 1, the wireless communication device 400 of FIG. 4, the AP 502 of FIG. 5A, or the AP MLD 610 of FIG. 6.

In some instances, the operation 1200 may be performed after the operation 1100 of FIG. 11. For example, at block 1202, the device terminates the enhanced synchronization mode responsive to an indication of timing synchronization between the first AP and each of a plurality of STAs participating in the enhanced synchronization mode. In some aspects, termination of the enhanced synchronization mode is further based on an indication of timing synchronization between the second AP and each of the plurality of STAs participating in the enhanced synchronization mode.

FIG. 13 shows a flowchart illustrating an example operation 1300 for wireless communication that supports an enhanced synchronization mode, according to some implementations. The operation 1300 may be performed by a wireless communication device such as the wireless communication device 400 described above with reference to FIG. 4. In some implementations, the operation 1300 may be performed by a wireless communication device operating as or within an AP, such as the AP 102 of FIG. 1, the wireless communication device 400 of FIG. 4, the AP 502 of FIG. 5A, or the AP MLD 610 of FIG. 6.

In some instances, the operation 1300 may be performed prior to transmitting the indication of the enhanced synchronization mode at 1102 of FIG. 11. For example, at block 1302, the device receives a request from one or more STAs to initiate the enhanced synchronization mode, where the indication of the enhanced synchronization mode is transmitted based on the request.

FIG. 14 shows a flowchart illustrating an example operation 1400 for wireless communications that supports an enhanced synchronization mode, according to some implementations. The operation 1400 may be performed by a wireless communication device such as the wireless communication device 400 described above with reference to FIG. 4. In some implementations, the operation 1400 may be performed by a wireless communication device operating as or within an AP, such as the AP 102 of FIG. 1, the wireless communication device 400 of FIG. 4, the AP 502 of FIG. 5A, or the AP MLD 610 of FIG. 6.

In some instances, the operation 1400 may be performed prior to transmitting the plurality of sync frames at 1104 of FIG. 11. For example, at block 1402, the device indicates a start time of the enhanced synchronization mode to the at least one STA. In some instances, the indicated start time may be carried in one or more of a beacon frame, a probe response frame, a broadcast action frame, or a Target Wake Time (TWT) response frame transmitted on the first communication link.

FIG. 15 shows a flowchart illustrating an example operation 1500 for wireless communications that supports an enhanced synchronization mode, according to some implementations. The operation 1500 may be performed by a wireless communication device such as the wireless communication device 400 described above with reference to FIG. 4. In some implementations, the operation 1500 may be performed by a wireless communication device operating as or within an AP, such as the AP 102 of FIG. 1, the wireless communication device 400 of FIG. 4, the AP 502 of FIG. 5A, or the AP MLD 610 of FIG. 6.

In some instances, the operation 1500 may be performed after the operation 1100 of FIG. 11. For example, at block 1502, the device obtains TSF offsets between the first AP and each of a plurality of STAs. At 1504, the device indicates, to each of a plurality of STAs, whether participation in the enhanced synchronization mode is mandatory or voluntary based at least in part on the TSF offsets. In some instances, whether participation in the enhanced synchronization mode is mandatory or voluntary for at least some of the plurality of STAs may be further based on an indication of latency-sensitive traffic on the first communication link.

FIG. 16 shows a flowchart illustrating an example operation 1600 for wireless communications that supports an enhanced synchronization mode, according to some implementations. The operation 1600 may be performed by a wireless communication device such as the wireless communication device 400 described above with reference to FIG. 4. In some implementations, the operation 1600 may be performed by a wireless communication device operating as or within an AP, such as the AP 102 of FIG. 1, the wireless communication device 400 of FIG. 4, the AP 502 of FIG. 5A, or the AP MLD 610 of FIG. 6.

In some instances, the operation 1600 may be performed at any time before, during, or after the operation 1100 of FIG. 11. For example, at block 1602, the device indicates, to the at least one STA, whether or not the first AP and the second AP share a common clock or a common TSF value across the first and second APs of the device. In some instances, the indication of the common clock or the common TSF value across the first and second APs of the device may be carried in one or more of a beacon frame, a probe response frame, a broadcast action frame. In other instances, the indication of the common clock or the common TSF value across the first and second APs may be carried in the sync frames. The at least one STA may use the indication to determine whether or not participation in the enhanced synchronization mode is to be used to maintain a certain level of timing synchronization with the second AP of the device. For example, if the first and second APs of the device share a common clock or a common TSF value, there may not be any TSF offset between the first and second APs of the device. As such, the at least one STA may be able to maintain sufficient timing synchronization with the first AP to avoid interfering with r-TWT SPs without participation in the enhanced synchronization mode.

FIG. 17 shows a flowchart illustrating an example operation 1700 for wireless communications that supports an enhanced synchronization mode, according to some implementations. The operation 1700 may be performed by a wireless communication device such as the wireless communication device 400 described above with reference to FIG. 4. In some implementations, the operation 1700 may be performed by a wireless communication device operating as or within an AP, such as the AP 102 of FIG. 1, the wireless communication device 400 of FIG. 4, the AP 502 of FIG. 5A, or the AP MLD 610 of FIG. 6.

In some instances, the operation 1700 may be performed at any time during the operation 1100 of FIG. 11. For example, at block 1702, the device rejects association requests from STAs that do not support the enhanced synchronization mode during a time period that commences prior to a start time of the enhanced synchronization mode. For example, the device may reject association requests on the first communication link from legacy devices to prevent such legacy devices from being able to contend for access to the first communication link during any r-TWT SP scheduled on the first communication link.

FIG. 18 shows a flowchart illustrating an example operation 1800 for wireless communications that supports an enhanced synchronization mode, according to some implementations. The operation 1800 may be performed by a wireless communication device such as the wireless communication device 400 described above with reference to FIG. 4. In some implementations, the operation 1800 may be performed by a wireless communication device operating as or within an AP, such as the AP 102 of FIG. 1, the wireless communication device 400 of FIG. 4, the AP 502 of FIG. 5A, or the AP MLD 610 of FIG. 6.

In some implementations, the operation 1800 may be performed at any time before during, or after the operation 1100 of FIG. 11. For example, at block 1802, the device receives, from the at least one STA, a frame indicating one or more of an amount of clock drift between the at least one STA and the first AP during each beacon interval, whether the at least one STA is participating in the enhanced synchronization mode, whether the at least one STA receives beacon frames on the first communication link or on a second communication link associated with the second AP, or a frequency with which the at least one STA receives beacon frames or sync frames indicating TSF information of the first AP. At 1804, the device schedules one or more TWT SPs or r-TWT SPs for latency-sensitive traffic on the first communication link based at least in part on the one or more indications received from the at least one STA.

FIG. 19 shows a flowchart illustrating an example operation 1900 for wireless communication that supports an enhanced synchronization mode, according to some implementations. The operation 1900 may be performed by wireless device such as the wireless communication device 400 described above with reference to FIG. 4. In some instances, the operation 1900 may be performed by a wireless device operating as or within a STA, such as one of the STAs 104 of FIG. 1, the wireless communication device 400 of FIG. 4, the STA 504 of FIG. 5B, or the non-AP MLD 620 of FIG. 6.

For example, at 1902, the device receives, from a first access point (AP) of an AP multi-link device (MLD), an indication of an enhanced synchronization mode on a first communication link associated with the first AP. At 1904, the device receives, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the AP MLD. In some implementations, each of the plurality of sync frames may also indicate the TSF value of the first AP. In some instances, the indication may be carried in one or more of a beacon frame, a probe response frame, a broadcast action frame, or a TWT response frame received on the first communication link. In some aspects, a time period between successive receptions of the sync frames may be approximately 20 milliseconds. In other aspects, the plurality of sync frames may be received at a data rate that is greater than a Basic data rate associated with beacon frame transmissions on the first communication link.

In various implementations, the device may be a non-AP MLD including a plurality of STAs configured to operate on a plurality of respective communication links. In some instances, at least one of the plurality of sync frames may be a FILS Discovery frame carrying a TSF value of the first AP. In various aspects, the indication of the enhanced synchronization mode may be received based on an indication of latency-sensitive traffic on at least the first communication link. In some aspects, the enhanced synchronization mode may be established in conjunction with one or more TWT SPs or one or more r-TWT SPs scheduled on the first communication link.

In some implementations, at 1906, the device may transmit a request for the AP MLD to initiate the enhanced synchronization mode. In some instances, the indication of the enhanced synchronization mode may be received from the AP MLD based on the request.

In other implementations, at 1908, the device may receive an indication of a start time of the enhanced synchronization mode from the AP MLD, at 1908. In some instances, the indication of the enhanced synchronization mode may be received from the AP MLD based on the request. In some instances, the indicated start time may be carried in one or more of a beacon frame, a probe response frame, a broadcast action frame, or a TWT response frame received on the first communication link.

In some other implementations, at 1910, the device may receive, from the AP MLD, an indication of whether participation in the enhanced synchronization mode is mandatory or voluntary for the device based at least in part on TSF offsets between the first AP and each of a plurality of STAs. In some instances, the indication of the common clock or the common TSF value across the first and second APs of the device may be carried in one or more of a beacon frame, a probe response frame, a broadcast action frame. In other instances, the indication of the common clock or the common TSF value across the first and second APs may be carried in the sync frames. In some aspects, the device may use the indication to determine whether or not participation in the enhanced synchronization mode is to be used to maintain a certain level of timing synchronization with the second AP of the AP MLD. For example, if the first and second APs of the AP MLD share a common clock or a common TSF value, there may not be any TSF offset between the first and second APs of the AP MLD. As such, the device may be able to maintain sufficient timing synchronization with the first AP to avoid interfering with r-TWT SPs without participation in the enhanced synchronization mode.

In some instances, at 1912, the device may receive, from the AP MLD, an indication of whether or not the first AP and the second AP share a common clock or a common TSF value across the first and second APs of the device.

FIG. 20 shows a flowchart illustrating an example operation 2000 for wireless communications that supports an enhanced synchronization mode, according to some implementations. The operation 2000 may be performed by a wireless communication device such as the wireless communication device 400 described above with reference to FIG. 4. In some implementations, the operation 2000 may be performed by a wireless device operating as or within a STA, such as one of the STAs 104 of FIG. 1, the wireless communication device 400 of FIG. 4, the STA 504 of FIG. 5B, or the non-AP MLD 620 of FIG. 6.

In some instances, the operation 2000 may be performed after the operation 1900 of FIG. 19. For example, at 2002, the device transmits, to the AP MLD, a frame indicating one or more of an amount of clock drift between the device and the first AP during each beacon interval, whether the device is participating in the enhanced synchronization mode, whether the device receives beacon frames on the first communication link or on a second communication link associated with the second AP, or a frequency with which the device receives beacon frames or sync frames indicating TSF information of the first AP. At 2004, the device receives, from the AP MLD, an indication of one or more Target Wake Time (TWT) Service Periods (SPs) or one or more restricted TWT (r-TWT) SPs for latency-sensitive traffic on the first communication link based at least in part on the one or more indications provided by the device.

Figure 21:
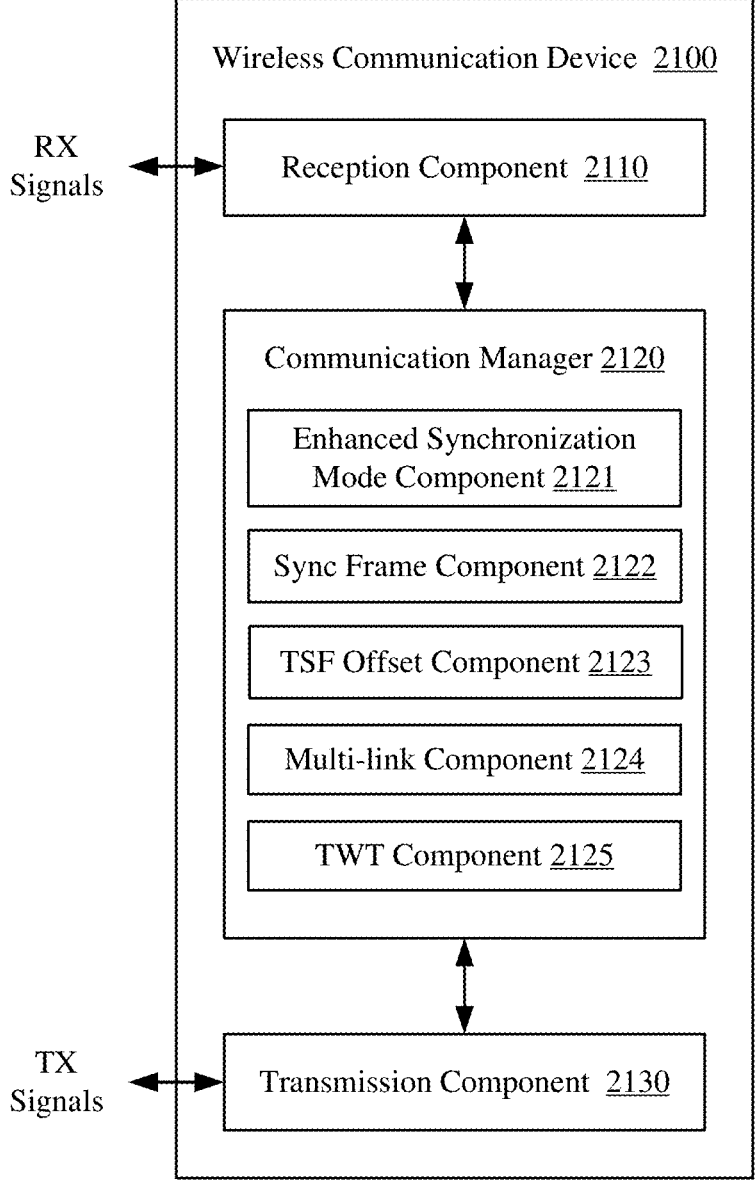
FIG. 21 shows a block diagram of an example wireless communication device.

FIG. 21 shows a block diagram of an example wireless communication device 1900. In some implementations, the wireless communication device 2100 may be configured to perform the operations 1200, 1300, 1400, 1500, 1600, 1700, and 1800 described with reference to FIGS. 12, 13, 14, 15, 16, 17, and 18, respectively. The wireless communication device 2100 can be an example implementation of any of the AP 102 of FIG. 1, the wireless communication device 400 of FIG. 4, the AP 502 of FIG. 5A, or the AP MLD 610 of FIG. 6. In some implementations, the wireless communication device 2100 can be an example of an AP MLD. More specifically, the wireless communication device 2100 can be a chip, SoC, chipset, package or device that includes at least one processor and at least one modem (for example, a Wi-Fi (IEEE 802.11) modem or a cellular modem).

The wireless communication device 2100 includes a reception component 2110, a communication manager 2120, and a transmission component 2130. The communication manager 2120 further includes an Enhanced Synchronization Mode component 2121, a Sync Frame component 2122, a TSF Offset component 2123, a multi-link component 2124, and a TWT component 2125. Portions of one or more of the components 2121-2125 may be implemented at least in part in hardware or firmware. In some implementations, one or more of the components 2121-2125 are implemented at least in part as software stored in a memory (such as the memory 408 of FIG. 4). For example, portions of one or more of the components 2121-2125 can be implemented as non-transitory instructions (or "code") executable by a processor (such as the processor 406 of FIG. 4) to perform the functions or operations of the respective component.

The reception component 2110 is configured to receive RX signals from one or more other wireless communication devices and the transmission component 2130 is configured to transmit TX signals to one or more other wireless communication devices. The communication manager 2120 is configured to manage wireless communications with one or more other wireless communication devices. In some implementations, the Enhanced Synchronization Mode component 2121 may establish an enhanced synchronization mode on one or more communication links associated with the wireless communication device 2100. The Sync Frame component 2122 may transmit a plurality of sync frames to one or more other wireless communication devices such as STAs, non-AP MLDs, and client devices. The TSF Offset component 2123 may determine or obtain TSF offsets between multiple APs within or associated with the wireless communication device 2100. The Multi-link component 2124 may establish a plurality of communication links associated with the wireless communication device 2100. The TWT component 2125 may schedule one or more TWT SPs or one or more r-TWT SPs for latency-sensitive traffic on one or more communication links associated with the wireless communication device 2100.

Figure 22:
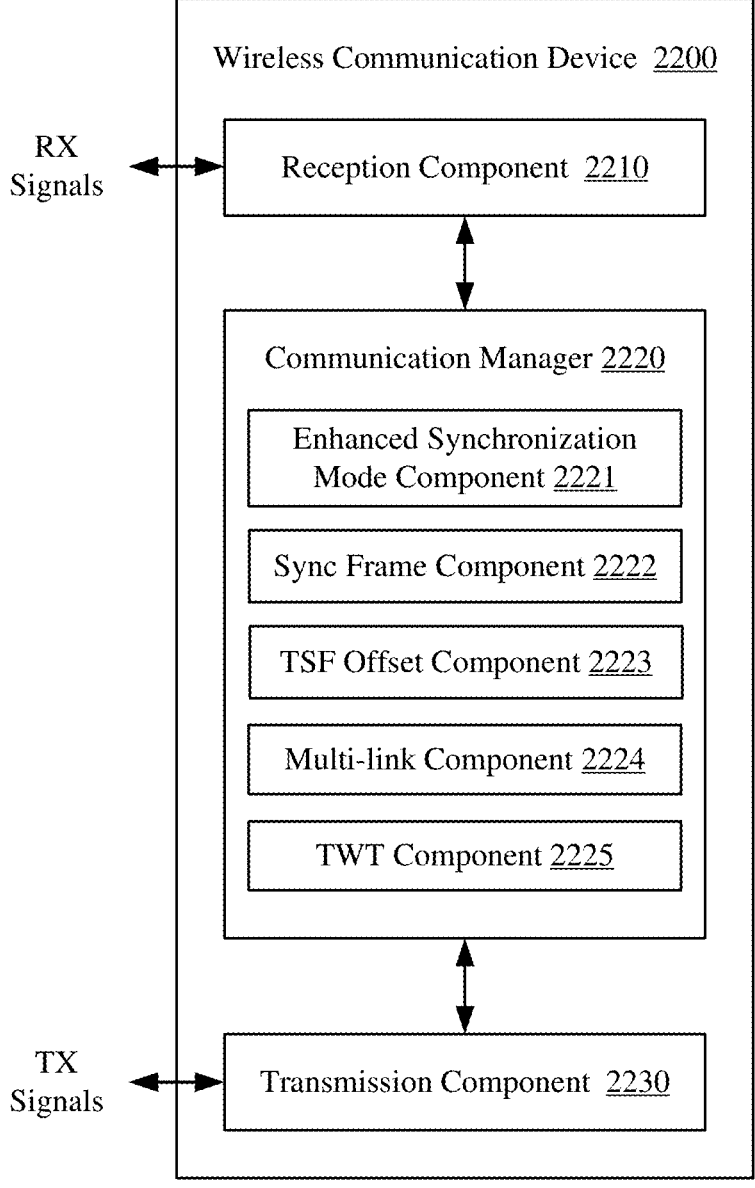
FIG. 22 shows a block diagram of another example wireless communication device.

FIG. 22 shows a block diagram of an example wireless communication device 1900. In some implementations, the wireless communication device 2200 may be configured to perform the operations 1900 and 2000 described with reference to FIGS. 19 and 20, respectively. The wireless communication device 2200 can be an example implementation of any of the STAs 104 of FIG. 1, the wireless communication device 400 of FIG. 4, the STA 504 of FIG. 5B, or the non-AP MLD 620 of FIG. 6. In some implementations, the wireless communication device 2200 can be an example of a STA MLD. More specifically, the wireless communication device 2200 can be a chip, SoC, chipset, package or device that includes at least one processor and at least one modem (for example, a Wi-Fi (IEEE 802.11) modem or a cellular modem).

The wireless communication device 2200 includes a reception component 2210, a communication manager 2220, and a transmission component 2230. The communication manager 2220 further includes an Enhanced Synchronization Mode component 2221, a Sync Frame component 2222, a TSF Offset component 2223, a multi-link component 2224, and a TWT component 2225. Portions of one or more of the components 2221-2225 may be implemented at least in part in hardware or firmware. In some implementations, one or more of the components 2221-2225 are implemented at least in part as software stored in a memory (such as the memory 408 of FIG. 4). For example, portions of one or more of the components 2221-2225 can be implemented as non-transitory instructions (or "code") executable by a processor (such as the processor 406 of FIG. 4) to perform the functions or operations of the respective component.

The reception component 2210 is configured to receive RX signals from one or more other wireless communication devices, and the transmission component 2230 is configured to transmit TX signals to one or more other wireless communication devices. The communication manager 2220 is configured to manage wireless communications with one or more other wireless communication devices. In some implementations, the Enhanced Synchronization Mode component 2221 may coordinate the participation of the wireless communication device 2200 in one or more enhanced synchronization modes established on a communication link. The Sync Frame component 2222 may receive a plurality of sync frames from one or more APs of an AP MLD. The TSF Offset component 2223 may determine or obtain TSF offsets between the wireless communication device 2200 and one or more other devices. The Multi-link component 2224 may establish a plurality of communication links associated with the wireless communication device 2200. The TWT component 2225 may schedule one or more TWT SPs or one or more r-TWT SPs for latency-sensitive traffic on one or more communication links associated with the wireless communication device 2200.

Implementation examples are described in the following numbered clauses:

1. A device, including:

at least one processor; and at least one memory communicatively coupled with the at least one processor and storing processor-readable code that, when executed by the at least one processor, is configured to:

transmit, to at least one wireless station (STA), an indication of an enhanced synchronization mode on a first communication link associated with a first access point (AP) of the device; and transmit, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the device.

2. The device of clause 1, where at least one of the plurality of sync frames includes a Fast Initial Link Setup (FILS) Discovery frame carrying a TSF value of the first AP.

3. The device of any one or more of clauses 1-2, where a time period between successive transmissions of the sync frames is approximately 20 milliseconds.

4. The device of any one or more of clauses 1-3, where the plurality of sync frames are transmitted at a data rate that is greater than a Basic data rate associated with beacon frame transmissions on the first communication link.

5. The device of any one or more of clauses 1-4, where the device includes an AP multi-link device (MLD) including the first AP and the second AP, the first AP associated with the first communication link, the second AP associated with a second communication link occupying a different frequency band than the first communication link.

6. The device of any one or more of clauses 1-5, where the indication is carried in one or more of a beacon frame, a probe response frame, a broadcast action frame, or a Target Wake Time (TWT) response frame transmitted on the first communication link.

7. The device of any one or more of clauses 1-6, where execution of the processor-readable code is further configured to:

terminate the enhanced synchronization mode responsive to an indication of timing synchronization between the first AP and each of a plurality of STAs participating in the enhanced synchronization mode.

8. The device of clause 7, where termination of the enhanced synchronization mode is further based on an indication of timing synchronization between the second AP and each of the plurality of STAs participating in the enhanced synchronization mode.

9. The device of any one or more of clauses 1-8, where the indication of the enhanced synchronization mode is transmitted based on an indication of latency-sensitive traffic on at least the first communication link.

10. The device of any one or more of clauses 1-9, where execution of the processor-readable code is further configured to:

receive a request from one or more STAs to initiate the enhanced synchronization mode, where the indication of the enhanced synchronization mode is transmitted based on the request.

11. The device of any one or more of clauses 1-10, where execution of the processor-readable code is further configured to:

indicate a start time of the enhanced synchronization mode to the at least one STA.

12. The device of clause 11, where the indicated start time is carried in one or more of a beacon frame, a probe response frame, a broadcast action frame, or a Target Wake Time (TWT) response frame transmitted on the first communication link.

13. The device of any one or more of clauses 1-12, where execution of the processor-readable code is further configured to:

obtain TSF offsets between the first AP and each of a plurality of STAs; and indicate, to each of a plurality of STAs, whether participation in the enhanced synchronization mode is mandatory or voluntary based at least in part on the TSF offsets.

14. The device of clause 13, where whether participation in the enhanced synchronization mode is mandatory or voluntary for at least some of the plurality of STAs is further based on an indication of latency-sensitive traffic on the first communication link.

15. The device of any one or more of clauses 1-14, where the enhanced synchronization mode is established in conjunction with one or more Target Wake Time (TWT) Service Periods (SPs) or one or more restricted TWT (r-TWT) SPs scheduled on the first communication link.

16. The device of any one or more of clauses 1-15, where execution of the processor-readable code is further configured to:

indicate, to the at least one STA, whether or not the first AP and the second AP share a common clock or a common TSF value across the first and second APs of the device.

17. The device of clause 16, where the indication of the common clock or the common TSF value across the first and second APs of the device is carried in one or more of a beacon frame, a probe response frame, a broadcast action frame, or the sync frames.

18. The device of any one or more of clauses 1-17, where execution of the processor-readable code is further configured to:

reject association requests from STAs that do not support the enhanced synchronization mode during a time period that commences prior to a start time of the enhanced synchronization mode.

19. The device of any one or more of clauses 1-18, where execution of the processor-readable code is further configured to:

receive, from the at least one STA, a frame indicating one or more of:

an amount of clock drift between the at least one STA and the first AP during each beacon interval, whether the at least one STA is participating in the enhanced synchronization mode, whether the at least one STA receives beacon frames on the first communication link or on a second communication link associated with the second AP, or a frequency with which the at least one STA receives beacon frames or sync frames indicating TSF information of the first AP; and schedule one or more Target Wake Time (TWT) Service Periods (SPs) or one or more restricted TWT (r-TWT) SPs for latency-sensitive traffic on the first communication link based at least in part on the one or more indications received from the at least one STA.

20. A method for wireless communication by a device, the method including:

transmitting, to at least one wireless station (STA), an indication of an enhanced synchronization mode on a first communication link associated with a first access point (AP) of the device; and transmitting, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the device.

21. The method of clause 20, where at least one of the plurality of sync frames includes a Fast Initial Link Setup (FILS) Discovery frame carrying a TSF value of the first AP.

22. The method of any one or more of clauses 20-21, where the device includes an AP multi-link device (MLD) including the first AP and the second AP, the first AP associated with the first communication link, the second AP associated with a second communication link occupying a different frequency band than the first communication link.

23. The method of any one or more of clauses 20-22, where the indication of the enhanced synchronization mode is transmitted based on an indication of latency-sensitive traffic on at least the first communication link.

24. The method of any one or more of clauses 20-23, further including:

receiving a request from one or more STAs to initiate the enhanced synchronization mode, where the indication of the enhanced synchronization mode is transmitted based on the request.

25. The method of any one or more of clauses 20-24, further including:

indicating a start time of the enhanced synchronization mode to the at least one STA.

26. The method of any one or more of clauses 20-25, further including:

obtaining TSF offsets between the first AP and each of a plurality of STAs; and indicating, to each of a plurality of STAs, whether participation in the enhanced synchronization mode is mandatory or voluntary based at least in part on the TSF offsets.

27. The method of clause 26, where whether participation in the enhanced synchronization mode is mandatory or voluntary for at least some of the plurality of STAs is further based on an indication of latency-sensitive traffic on the first communication link.

28. The method of any one or more of clauses 20-27, where the enhanced synchronization mode is established in conjunction with one or more Target Wake Time (TWT) Service Periods (SPs) or one or more restricted TWT (r-TWT) SPs scheduled on the first communication link.

29. The method of any one or more of clauses 20-28, further including:

indicating, to the at least one STA, whether or not the first AP and the second AP share a common clock or a common TSF value across the first and second APs of the device.

30. The method of any one or more of clauses 20-29, further including:

receiving, from the at least one STA, a frame indicating one or more of:

an amount of clock drift between the at least one STA and the first AP during each beacon interval, whether the at least one STA is participating in the enhanced synchronization mode, whether the at least one STA receives beacon frames on the first communication link or on a second communication link associated with the second AP, or a frequency with which the at least one STA receives beacon frames or sync frames indicating TSF information of the first AP; and scheduling one or more Target Wake Time (TWT) Service Periods (SPs) or one or more restricted TWT (r-TWT) SPs for latency-sensitive traffic on the first communication link based at least in part on the one or more indications received from the at least one STA.

31. A device, including:

at least one processor; and at least one memory communicatively coupled with the at least one processor and storing processor-readable code that, when executed by the at least one processor, is configured to:

receive, from a first access point (AP) of an AP multi-link device (MLD), an indication of an enhanced synchronization mode on a first communication link associated with the first AP; and receive, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the AP MLD.

32. The device of clause 31, where at least one of the plurality of sync frames includes a Fast Initial Link Setup (FILS) Discovery frame carrying a TSF value of the first AP.

33. The device of any one or more of clauses 31-32, where a time period between successive receptions of the sync frames is approximately 20 milliseconds.

34. The device of any one or more of clauses 31-33, where the plurality of sync frames are received at a data rate that is greater than a Basic data rate associated with beacon frame transmissions on the first communication link.

35. The device of any one or more of clauses 31-34, where the indication is carried in one or more of a beacon frame, a probe response frame, a broadcast action frame, or a Target Wake Time (TWT) response frame received on the first communication link.

36. The device of any one or more of clauses 31-35, where the indication of the enhanced synchronization mode is received based on an indication of latency-sensitive traffic on at least the first communication link.

37. The device of any one or more of clauses 31-36, where execution of the processor-readable code is further configured to:

transmit, to the AP MLD, a request to initiate the enhanced synchronization mode, where the indication of the enhanced synchronization mode is received based on the request.

38. The device of any one or more of clauses 31-37, where execution of the processor-readable code is further configured to:

receive an indication of a start time of the enhanced synchronization mode from the AP MLD.

39. The device of clause 38, where the indicated start time is carried in one or more of a beacon frame, a probe response frame, a broadcast action frame, or a Target Wake Time (TWT) response frame received on the first communication link.

40. The device of any one or more of clauses 31-39, where execution of the processor-readable code is further configured to:

receive, from the AP MLD, an indication of whether participation in the enhanced synchronization mode is mandatory or voluntary for the device based at least in part on TSF offsets between the first AP and each of a plurality of STAs.

41. The device of clause 40, where whether participation in the enhanced synchronization mode is mandatory or voluntary for the device is further based on an indication of latency-sensitive traffic on the first communication link.

42. The device of any one or more of clauses 31-41, where the enhanced synchronization mode is established in conjunction with one or more Target Wake Time (TWT) Service Periods (SPs) or one or more restricted TWT (r-TWT) SPs scheduled on the first communication link.

43. The device of any one or more of clauses 31-42, where execution of the processor-readable code is further configured to:

receive, from the AP MLD, an indication of whether or not the first AP and the second AP share a common clock or a common TSF value across the first and second APs of the device.

44. The device of clause 43, where the indication of the common clock or the common TSF value across the first and second APs of the device is carried in one or more of a beacon frame, a probe response frame, a broadcast action frame, or the sync frames.

45. The device of any one or more of clauses 31-44, where execution of the processor-readable code is further configured to:

transmit, to the AP MLD, a frame indicating one or more of:

an amount of clock drift between the device and the first AP during each beacon interval, whether the device is participating in the enhanced synchronization mode, whether the device receives beacon frames on the first communication link or on a second communication link associated with the second AP, or a frequency with which the device receives beacon frames or sync frames indicating TSF information of the first AP; and receive, from the AP MLD, an indication of one or more Target Wake Time (TWT) Service Periods (SPs) or one or more restricted TWT (r-TWT) SPs for latency-sensitive traffic on the first communication link based at least in part on the one or more indications provided by the device.

46. A method for wireless communication by a device, the method including:

receiving, from a first access point (AP) of an AP multi-link device (MLD), an indication of an enhanced synchronization mode on a first communication link associated with the first AP; and receiving, during the enhanced synchronization mode, a plurality of sync frames on the first communication link more often than Target Beacon Transmission Times (TBTTs) associated with the first communication link, each of the plurality of sync frames indicating a Timing Synchronization Function (TSF) offset between the first AP and a second AP of the AP MLD.

47. The method of clause 46, where at least one of the plurality of sync frames includes a Fast Initial Link Setup (FILS) Discovery frame carrying a TSF value of the first AP.

48. The method of any one or more of clauses 46-47, where a time period between successive transmissions of the sync frames is approximately 20 milliseconds.

49. The method of any one or more of clauses 46-48, where the plurality of sync frames are received at a data rate that is greater than a Basic data rate associated with beacon frame transmissions on the first communication link.

50. The method of any one or more of clauses 46-49, where the indication is carried in one or more of a beacon frame, a probe response frame, a broadcast action frame, or a Target Wake Time (TWT) response frame received on the first communication link.

51. The method of any one or more of clauses 46-50, where the indication of the enhanced synchronization mode is received based on an indication of latency-sensitive traffic on at least the first communication link.

52. The method of any one or more of clauses 46-51, further including:

transmitting, to the AP MLD, a request to initiate the enhanced synchronization mode, where the indication of the enhanced synchronization mode is received based on the request.

53. The method of any one or more of clauses 46-52, further including:

receiving an indication of a start time of the enhanced synchronization mode from the AP MLD.

54. The method of clause 53, where the indicated start time is carried in one or more of a beacon frame, a probe response frame, a broadcast action frame, or a Target Wake Time (TWT) response frame received on the first communication link.

55. The method of any one or more of clauses 46-54, further including:

receiving, from the AP MLD, an indication of whether participation in the enhanced synchronization mode is mandatory or voluntary for the device based at least in part on TSF offsets between the first AP and each of a plurality of STAs.

56. The method of clause 55, where whether participation in the enhanced synchronization mode is mandatory or voluntary for the device is further based on an indication of latency-sensitive traffic on the first communication link.

57. The method of any one or more of clauses 46-56, where the enhanced synchronization mode is established in conjunction with one or more Target Wake Time (TWT) Service Periods (SPs) or one or more restricted TWT (r-TWT) SPs scheduled on the first communication link.

58. The method of any one or more of clauses 46-57, further including:

receiving, from the AP MLD, an indication of whether or not the first AP and the second AP share a common clock or a common TSF value across the first and second APs of the device.

59. The method of clause 58, where the indication of the common clock or the common TSF value across the first and second APs of the device is carried in one or more of a beacon frame, a probe response frame, a broadcast action frame, or the sync frames.

60. The method of any one or more of clauses 46-59, further including:

transmitting, to the AP MLD, a frame indicating one or more of:

an amount of clock drift between the device and the first AP during each beacon interval, whether the device is participating in the enhanced synchronization mode, whether the device receives beacon frames on the first communication link or on a second communication link associated with the second AP, or a frequency with which the device receives beacon frames or sync frames indicating TSF information of the first AP; and receiving, from the AP MLD, an indication of one or more Target Wake Time (TWT) Service Periods (SPs) or one or more restricted TWT (r-TWT) SPs for latency-sensitive traffic on the first communication link based at least in part on the one or more indications provided by the device.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A device, comprising:
  at least one processor; and at least one memory communicatively coupled with the at least one processor and storing processor-readable code that, when executed by the at least one processor, is configured to:
  transmit, to at least one wireless station (STA) on a first communication link associated with a first access point (AP) of the device, an indication of an enhanced synchronization mode that enables sync frames to be communicated more often than Target Beacon Transmission Times (TBTTs) on the first communication link and an indication of whether participation in the enhanced synchronization mode is mandatory or voluntary based at least in part on a first Timing Synchronization Function (TSF) offset between the first AP and the at least one STA; and
  transmit, during the enhanced synchronization mode, a plurality of sync frames on the first communication link more often than the TBTTs associated with the first communication link, a first time interval between a pair of sync frames of the plurality of sync frames being shorter than a second time interval between a pair of the TBTTs, each of the plurality of sync frames indicating a respective TSF offset between the first AP and a second AP of the device.

2. The device of claim 1, wherein at least one of the plurality of sync frames comprises a Fast Initial Link Setup (FILS) Discovery frame carrying a TSF value of the first AP.

3. The device of claim 1, wherein a time period between successive transmissions of the sync frames is approximately 20 milliseconds.

4. The device of claim 1, wherein the plurality of sync frames are transmitted at a data rate that is greater than a Basic data rate associated with beacon frame transmissions on the first communication link.

5. The device of claim 1, wherein the device comprises an AP multi-link device (MLD) including the first AP and the second AP, the first AP associated with the first communication link, the second AP associated with a second communication link occupying a different frequency band than the first communication link.

6. The device of claim 1, wherein the indication is carried in one or more of a beacon frame, a probe response frame, a broadcast action frame, or a Target Wake Time (TWT) response frame transmitted on the first communication link.

7. The device of claim 1, wherein execution of the processor-readable code is further configured to:
  terminate the enhanced synchronization mode responsive to an indication of timing synchronization between the first AP and each of a plurality of STAs participating in the enhanced synchronization mode.

8. The device of claim 7, wherein termination of the enhanced synchronization mode is further based on an indication of timing synchronization between the second AP and each of the plurality of STAs participating in the enhanced synchronization mode.

9. The device of claim 1, wherein the indication of the enhanced synchronization mode is transmitted based on an indication of latency-sensitive traffic on at least the first communication link.

10. The device of claim 1, wherein execution of the processor- readable code is further configured to:
  receive a request from one or more STAs to initiate the enhanced synchronization mode, wherein the indication of the enhanced synchronization mode is transmitted based on the request.

11. The device of claim 1, wherein execution of the processor-readable code is further configured to:

indicate a start time of the enhanced synchronization mode to the at least one STA.

12. The device of claim 11, wherein the indicated start time is carried in one or more of a beacon frame, a probe response frame, a broadcast action frame, or a Target Wake Time (TWT) response frame transmitted on the first communication link.

13. The device of claim 1, wherein execution of the processor-readable code is further configured to:

obtain a respective TSF offset between the first AP and each of a plurality of STAs including the at least one STA; and indicate, to each of a plurality of STAs including the at least one STA, whether participation in the enhanced synchronization mode is mandatory or voluntary based at least in part on the respective TSF offset.

14. The device of claim 13, wherein whether participation in the enhanced synchronization mode is mandatory or voluntary for at least some of the plurality of STAs, including the at least one STA, is further based on an indication of latency-sensitive traffic on the first communication link.

15. The device of claim 1, wherein the enhanced synchronization mode is established in conjunction with one or more Target Wake Time (TWT) Service Periods (SPs) or one or more restricted TWT (r-TWT) SPs scheduled on the first communication link.

16. The device of claim 1, wherein execution of the processor-readable code is further configured to:

indicate, to the at least one STA, whether or not the first AP and the second AP share a common clock or a common TSF value across the first AP of the device and the second AP of the device.

17. The device of claim 16, wherein the indication of the common clock or the common TSF value across the first AP of the device and the second AP of the device is carried in one or more of a beacon frame, a probe response frame, a broadcast action frame, or the sync frames.

18. The device of claim 1, wherein execution of the processor-readable code is further configured to:

reject association requests from STAs that do not support the enhanced synchronization mode during a time period that commences prior to a start time of the enhanced synchronization mode.

19. The device of claim 1, wherein execution of the processor-readable code is further configured to:

receive, from the at least one STA, a frame indicating one or more of:

an amount of clock drift between the at least one STA and the first AP during each beacon interval, whether the at least one STA is participating in the enhanced synchronization mode, whether the at least one STA receives beacon frames on the first communication link or on a second communication link associated with the second AP, or a frequency with which the at least one STA receives beacon frames or sync frames indicating TSF information of the first AP; and schedule one or more Target Wake Time (TWT) Service Periods (SPs) or one or more restricted TWT (r-TWT) SPs for latency-sensitive traffic on the first communication link based at least in part on the one or more indications received from the at least one STA.

20. A method for wireless communication by a device, the method comprising:

transmitting, to at least one wireless station (STA) on a first communication link associated with a first access point (AP) of the device, an indication of an enhanced synchronization mode that enables sync frames to be communicated more often than Target Beacon Transmission Times (TBTTs) on a first communication link and an indication of whether participation in the enhanced synchronization mode is mandatory or voluntary based at least in part on a first Timing Synchronization Function (TSF) offset between the first AP and the at least one STA; and transmitting, during the enhanced synchronization mode, a plurality of sync frames on the first communication link more often than the TBTTs associated with the first communication link, a first time interval between a pair of sync frames of the plurality of sync frames being shorter than a second time interval between a pair of the TBTTs, each of the plurality of sync frames indicating a respective TSF offset between the first AP and a second AP of the device.

21. A device, comprising:

at least one processor; and at least one memory communicatively coupled with the at least one processor and storing processor-readable code that, when executed by the at least one processor, is configured to:

receive, from a first access point (AP) of an AP multi-link device (MLD) on a first communication link associated with the first AP, an indication of an enhanced synchronization mode that enables sync frames to be communicated more often than Target Beacon Transmission Times (TBTTs) on the first communication link and an indication of whether participation in the enhanced synchronization mode is mandatory or voluntary based at least in part on a first Timing Synchronization Function (TSF) offset between the first AP and the device; and receive, during the enhanced synchronization mode, a plurality of sync frames on the first communication link more often than the TBTTs associated with the first communication link, a first time interval between a pair of sync frames of the plurality of sync frames being shorter than a second time interval between a pair of the TBTTs, each of the plurality of sync frames indicating a respective TSF offset between the first AP and a second AP of the device.

22. The device of claim 21, wherein at least one of the plurality of sync frames comprises a Fast Initial Link Setup (FILS) Discovery frame carrying a TSF value of the first AP.

23. The device of claim 21, wherein a time period between successive receptions of the sync frames is approximately 20 milliseconds.

24. The device of claim 21, wherein the plurality of sync frames are received at a data rate that is greater than a Basic data rate associated with beacon frame transmissions on the first communication link.

25. The device of claim 21, wherein the indication is carried in one or more of a beacon frame, a probe response frame, a broadcast action frame, or a Target Wake Time (TWT) response frame received on the first communication link.

26. The device of claim 21, wherein the indication of the enhanced synchronization mode is received based on an indication of latency-sensitive traffic on at least the first communication link.

27. The device of claim 21, wherein execution of the processor-readable code is further configured to:

transmit, to the AP MLD, a request to initiate the enhanced synchronization mode, wherein the indication of the enhanced synchronization mode is received based on the request.

28. The device of claim 21, wherein execution of the processor- readable code is further configured to:

receive an indication of a start time of the enhanced synchronization mode from the AP MLD.

29. The device of claim 21, wherein execution of the processor-readable code is further configured to:

receive, from the AP MLD, an indication of whether or not the first AP and the second AP share a common clock or a common TSF value across the first AP of the AP MLD and the second AP of the AP MLD.

30. A method for wireless communication by a device, the method comprising:

receiving, from a first access point (AP) of an AP multi-link device (MLD) on a first communication link associated with the first AP, an indication of an enhanced synchronization mode that enables sync frames to be communicated more often than Target Beacon Transmission Times (TBTTs) on the first communication link and an indication of whether participation in the enhanced synchronization mode is mandatory or voluntary based at least in part on a first Timing Synchronization Function (TSF) offset between the first AP and the device; and receiving, during the enhanced synchronization mode, a plurality of sync frames on the first communication link more often than the TBTTs associated with the first communication link, a first time interval between a pair of sync frames of the plurality of sync frames being shorter than a second time interval between a pair of the TBTTs, each of the plurality of sync frames indicating a respective TSF offset between the first AP and a second AP of the device.

* * * * *